(12) United States Patent
Nakagawa

(10) Patent No.: US 7,661,887 B2
(45) Date of Patent: Feb. 16, 2010

(54) SHUTTER ASSEMBLY

(75) Inventor: Masaya Nakagawa, Kyoto-fu (JP)

(73) Assignee: Suncall Corporation (JP)

( * ) Notice: Subject to any disclaimer, the term of this patent is extended or adjusted under 35 U.S.C. 154(b) by 0 days.

(21) Appl. No.: 12/143,336

(22) Filed: Jun. 20, 2008

(65) Prior Publication Data
US 2008/0317428 A1 Dec. 25, 2008

(30) Foreign Application Priority Data
Jun. 20, 2007 (JP) ............................ 2007-162323

(51) Int. Cl.
G02B 6/38 (2006.01)
G02B 6/36 (2006.01)

(52) U.S. Cl. ......................................... 385/70; 385/92

(58) Field of Classification Search .................. 385/70, 385/92
See application file for complete search history.

(56) References Cited

U.S. PATENT DOCUMENTS

| | | | |
|---|---|---|---|
| 5,687,268 A * | 11/1997 | Stephenson et al. ........... 385/73 |
| 5,887,098 A * | 3/1999 | Ernst et al. .................... 385/55 |
| 6,206,577 B1 * | 3/2001 | Hall et al. ...................... 385/53 |
| 6,595,696 B1 * | 7/2003 | Zellak .......................... 385/72 |
| 6,688,780 B2 * | 2/2004 | Duran .......................... 385/76 |
| 6,715,930 B2 * | 4/2004 | McBride ....................... 385/73 |
| 6,866,424 B2 * | 3/2005 | Tanaka et al. ................. 385/55 |
| 7,182,524 B2 * | 2/2007 | Kramer et al. ................ 385/78 |
| 7,340,146 B2 * | 3/2008 | Lampert et al. ............. 385/139 |
| 2003/0147597 A1 * | 8/2003 | Duran .......................... 385/76 |
| 2003/0180005 A1 * | 9/2003 | McBride ....................... 385/73 |
| 2004/0062486 A1 * | 4/2004 | Tanaka et al. ................. 385/55 |
| 2006/0204200 A1 * | 9/2006 | Lampert et al. ............. 385/139 |

FOREIGN PATENT DOCUMENTS

| | | | |
|---|---|---|---|
| JP | 2002-148483 | * | 5/2002 |
| JP | 2006106635 A | * | 4/2006 |

* cited by examiner

Primary Examiner—K. Cyrus Kianni
(74) Attorney, Agent, or Firm—Sterne, Kessler, Goldstein & Fox P.L.L.C.

(57) ABSTRACT

According to the shutter assembly of the present invention, since the guide groove for facilitating the insertion of the pivot shaft into the bearing hole of the second bearing part of the shutter member is formed at the opposing end surface of the second bearing part that faces to the first bearing part of the shutter member so that the guide groove is opened to the opposing end surface and is along the direction orthogonal to the axial-line direction of the pivot shaft, it is possible to easily and accurately form the guide groove.

5 Claims, 14 Drawing Sheets

F I G. 3
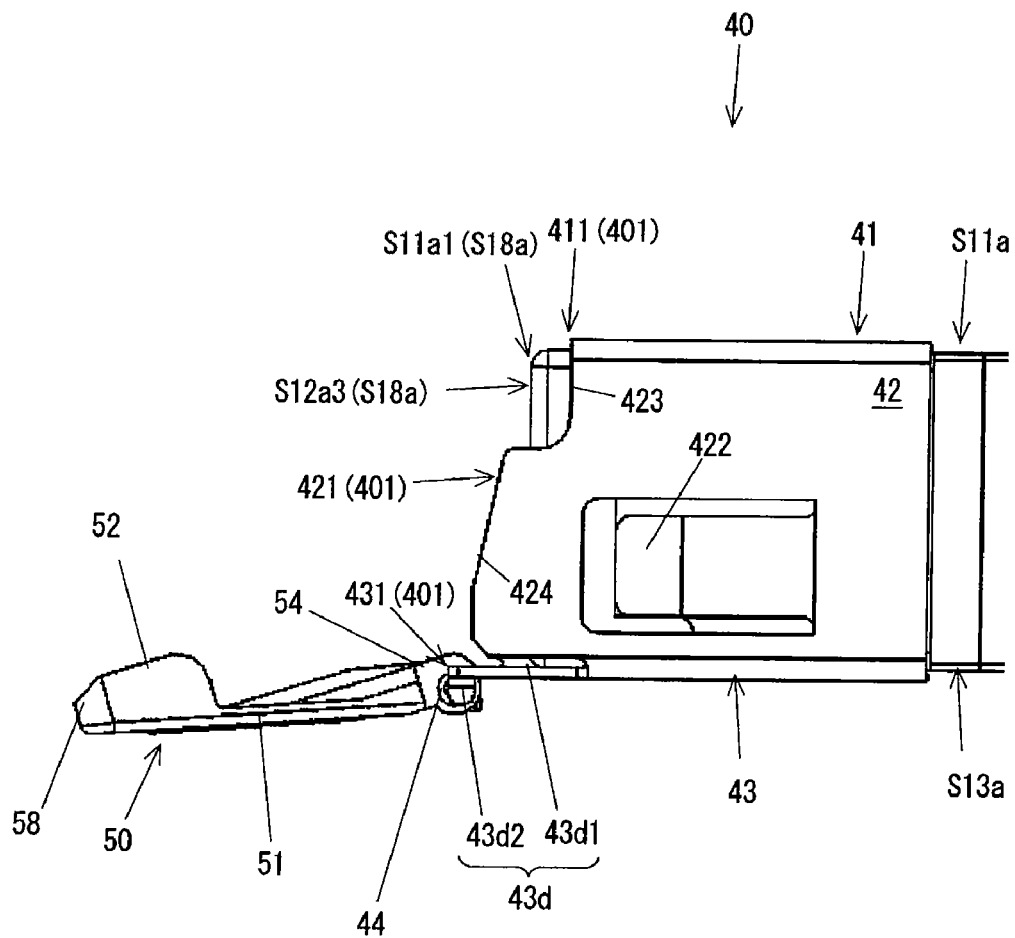

F I G. 4
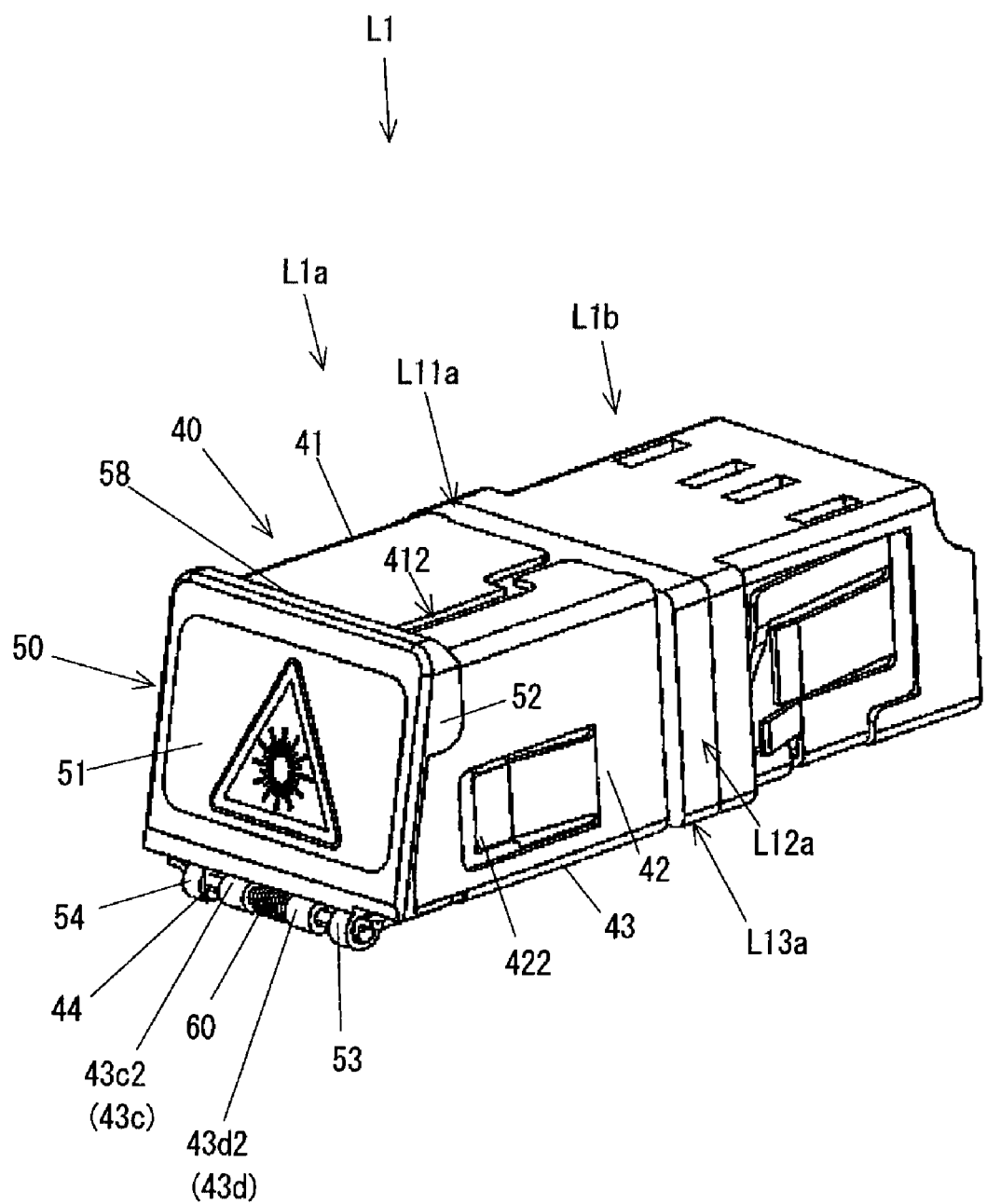

SHUTTER ASSEMBLY

BACKGROUND OF THE INVENTION

1. Field of the Invention

The present invention relates to a shutter assembly mounted on a optical adapter to which one optical cable with an optical connecter is detachably coupled from a first side and the other optical cable is coupled from a second side opposite to the first side.

2. Related Art

There is a conventionally known configuration wherein one optical cable can be coupled with another optical cable through an optical adapter which accepts an optical connector for terminating an optical cable and facilitating connection to and/or separation from another device. The optical adapter is configured such that a first end side and a second end side of an internal space sectioned by a bottom wall, a pair of side walls and an upper wall respectively form first and second accommodating sections which accept first and second optical cables, and a hollow sleeve into which ferrules of the first and second optical cables are inserted is provided at an intermediate portion in the optical adapter. In a case where the optical adapter is used in a state where the optical cable is inserted into only one of the first and second accommodating sections of the optical adapter (in other words, in a case where the optical adapter is used in a state where the optical cable inserted into the one of the first and second accommodating sections is terminated within the optical adapter), there may occur such problems that dust or dirt is attached to a distal end of the inserted optical cable, and a user directly looks at light from the optical cable. In order to prevent the problems from occurring, there is a conventionally known configuration including a shutter member coupled in a swingable manner with a first-end-side edge of the bottom wall via a pivot shaft so as to open or close an opening end of the optical adapter sectioned by first-end-side edges of the bottom wall, the pair of side walls and the upper wall (for example, see Japanese Unexamined Patent Publication No. 2002-148483).

When such shutter member is attached to the optical adapter, the pivot shaft is first inserted through a first bearing part of the shutter member from an outer end surface thereof, which is on a side opposite to another second bearing part of the shutter member.

After the pivot shaft is passed through the first bearing part, the pivot shaft going out of an end surface of the first bearing part facing to the second bearing part is then inserted into a bearing part provided on the optical adapter. The pivot shaft, which has been inserted through the bearing part of the optical adapter is finally inserted through the second bearing part from an end surface thereof facing to the first bearing part.

There is a known conventional configuration wherein a guide hole (which is also so-called a countersunk hole) opened to an end surface (an insert-side end surface) of the bearing part positioned on a side from which the pivot shaft is inserted and having a diameter which becomes smaller as a distance to an end surface (an exsert-side end surface) positioned on a side from which the inserted pivot shaft goes out becomes larger, in order to enhance assembly workability of the shutter member by facilitating the insertion of the pivot shaft into the respective bearing parts. The provision of the guide hole enlarges an opening diameter of the bearing part at the insert-side end surface of the bearing part positioned on the side from which the pivot shaft is inserted, which makes it easy to insert the pivot shaft.

However, it is difficult to provide the guide hole at the insert-side end surface of the second bearing part, which is the end surface facing to the first bearing part. That is, in a case where the shutter member integrally including the first and second bearing parts is formed, it becomes necessary to release a die used for the formation of the guide hole in an axial-line direction of the first and second bearing parts (a direction where the pivot shaft is inserted) in order to form the guide hole in the bearing parts of the shutter member. However, since a distance between the end surfaces of the first and second bearing parts that face to each other cannot be set to be large due to a demanded size of the shutter member, it is difficult to provide the die for the guide hole between the first and second bearing parts. Further, if the die for the guide hole is hypothetically provided, it is still difficult to release the die in the axial-line direction. As a result, accuracy in forming the guide hole is deteriorated, which, in fact, deteriorates assembly workability of the shutter member.

BRIEF SUMMARY OF THE INVENTION

In view of the prior art, it is an object of the present invention to provide a shutter assembly capable of enhancing assembly workability of a shutter member that is directly or indirectly connected in a swingable manner to an optical adapter so as to open or close a first-end-side opening of the optical adapter.

The present invention provides, in order to achieve the object, a shutter assembly mounted on a first end side of an optical adapter to which a first optical cable with an optical connector is detachably coupled from the first end side and a second optical cable is coupled from a second end side. The optical adapter is configured so that first and second end sides of an inner space defined by a bottom wall, a pair of side wall and an upper wall respectively form first and second accommodating sections that respectively accept the first and second optical cables, and a hollow sleeve into which ferrules of the first and second optical cables are inserted is arranged on an intermediate portion of the inner space.

The shutter assembly includes a shutter housing which is mounted on the first end side of the optical adapter so as to surround the optical adapter, the shutter housing including a bottom-surface section, a pair of side-surface sections and an upper-surface section respectively brought into contact with the outer peripheral surfaces of the bottom wall, the pair of side walls and the upper wall of the optical adapter in a state of being mounted on the optical adapter; a shutter member coupled in a swingable manner with a first-end-side edge of the bottom-surface section through a pivot shaft so as to open or close a first-end-side opening of the shutter housing defined by first-end-side edges of the upper-surface section, the pair of side-surface sections and the bottom-surface section; and a coil spring which energizes the shutter member in such a direction that the shutter member closes the first-end-side opening of the shutter housing.

The shutter member includes a shutter main body that closes the first-end-side opening of the shutter housing, and a pair of first and second bearing parts which are integrally formed on a proximal-end-side surface of the shutter main body and through which the pivot shaft is inserted. The second bearing parts is formed with a guide groove that is opened at an opposing end surface facing to the first bearing part and that is along a direction orthogonal to an axial-line direction of the pivot shaft. The guide groove has an opening width that is larger than a diameter of a bearing hole of the second bearing part at the opposing end surface and that becomes narrow as it being away from the opposing end surface in a direction opposite to the first bearing part.

According to the shutter assembly, since the guide groove for facilitating the insertion of the pivot shaft into the bearing hole of the second bearing part is formed at the opposing end surface of the second bearing part that faces to the first bearing part so that the guide groove is opened to the opposing end surface and is along the direction orthogonal to the axial-line direction of the pivot shaft, it is possible to easily and accurately form the guide groove.

Specifically, the shutter member integrally including the first and second bearing parts could be formed with resin by using a die including first and second formation portions that are separate from each other. The first formation portion is configured so as to form the substantially entire of the shutter member with the first and second bearing parts other than the guide groove. The second formation portion is configured so as to form the guide groove. According to the shutter assembly of the present invention, it is possible to remove the second formation portion from the first formation in the direction orthogonal to the axial-line direction of the pivot shaft, thereby easily removing the second formation portion from the first formation portion without being distracted by the first bearing part facing to the second bearing part. Therefore, it is possible to easily and accurately form the guide groove.

Further, since the guide groove has an opening width that is larger than a diameter of a bearing hole of the second bearing part at the opposing end surface and that becomes narrow as it being away from the opposing end surface in a direction opposite to the first bearing part, it is possible to easily insert the distal end of the pivot shaft, which has been passed through the first bearing part, into the second bearing part, thereby enhancing assembly workability of the shutter member.

Preferably, the first bearing part may be formed with a guide hole that is opened at an outer end surface on a side opposite to the second bearing part and that has a diameter becoming smaller as it advances in a direction close to the second bearing part.

That is, in the preferable configuration, the guide hole is formed at the outer end surface of the first bearing part that is an end surface from which the distal end of the pivot shaft is inserted into the first bearing part.

According to the configuration, it is possible to easily insert the pivot shaft into the first bearing part, thereby further enhancing assembly workability of the shutter member.

Preferably, the bottom-surface section includes a plate-like shaped bottom-surface main body brought into contact with the bottom wall; a support piece extending from the bottom-surface main body to a first end side between the first and second bearing parts and supporting the pivot shaft in a state where the shutter member is coupled with the shutter housing; a first stopper piece extending from the bottom-surface main body to the first end side at a position outward in an axial-line direction of the pivot shaft than the first bearing part in a state where the shutter member is coupled with the shutter housing, the first stopper piece facing to a proximal end of the pivot shaft; and a second stopper piece extending from the bottom-surface main body to the first end side at a position outward in the axial-line direction of the pivot shaft than the second bearing part in a state where the shutter member is coupled with the shutter housing, the second stopper piece facing to a distal end of the pivot shaft.

In the configuration, the proximal-end-side surface of the shutter main body is configured so that at least a region corresponding to the first stopper piece is cut out.

In the shutter assembly, the shutter member is connected to the shutter housing by following steps.

Firstly, a first deformation is made on the first stopper piece so that a distal end of the first stopper piece is positioned away from the bottom wall of the optical adapter, and in this state, the distal end of the pivot shaft is inserted through the first bearing part of the shutter member, and the distal end of the pivot shaft is supported by the support piece of the bottom-surface section in the shutter housing. After that, the distal end of the pivot shaft is inserted into the coil spring and the second bearing part.

In a state where the distal end of the pivot shaft is inserted through the second bearing part, the second stopper piece is positioned so as to face to the distal end of the pivot shaft, thereby effectively preventing the pivot shaft from slipping out in the insertion direction.

After the insertion of the distal end of the pivot shaft through the second bearing part, a second deformation is made on the first stopper piece so that the distal end of the first stopper piece is close to the bottom wall of the optical adapter to be positioned at its initial position before the first deformation is made, which causes the first stopper piece to face to the proximal end of the pivot shaft so that the pivot shaft can be prevented by the first stopper piece from slipping out in a direction opposite to the insertion direction.

By the way, if the entire area of the proximal-end-side surface of the shutter main body has a linear shape, a gap between the first stopper piece and the proximal-end-side surface becomes small. Therefore, in the configuration, it becomes difficult to perform the second deformation on the first stopper piece so that the first stopper piece is deformed again in the direction close to the bottom wall of the optical adapter to be positioned at its initial position. That is, in a case where the gap between the first stopper piece and the proximal-end-side surface is small, the first stopper piece may not return to its initial position before the first deformation is made due to its elasticity, which may cause a problem that the first stopper piece could not reliably prevent the pivot shaft from slipping out.

On the contrary, in the configuration according to the present invention, the proximal-end-side surface of the shutter main body is configured so that at least a region corresponding to the first stopper piece is cut out.

By providing the arrangement, when performing the second deformation on the first stopper piece so that the first stopper piece is deformed again in the direction close to the bottom wall of the optical adapter to its initial position, it is possible to easily increase a degree of the bending deformation, thereby reliably repositioning the first stopper piece at its initial position before the first deformation is performed. As a result, the pivot shaft can be more reliably prevented from slipping out by the first stopper piece.

Preferably, the first stopper piece includes an arm portion extending from the bottom-surface main body to the first end side, and a stopping-surface portion bent from the arm portion so as to face to the proximal end of the pivot shaft.

According to the configuration, the first stopper piece prevent the pivot shaft from slipping out by contacting in a surface-to-surface manner with the proximal end and the distal end of the pivot shaft. Therefore, it is possible to reliably prevent the pivot shaft from slipping out by the first stopper piece even in a case where there are differences in the degree of the second deformation for deforming the first stopper piece again in the direction adjacent to the first bottom wall of the optical adapter to its initial position before the first deformation is made.

Preferably, the coil spring has a first end engaged into inside portion or with an outer surface of the shutter member and a second end engaged with an outer surface of the bottom-surface section so that its stored elasticity becomes large as the shutter member moves from the closing position to the opening position, and the shutter main body includes an engagement hole which is formed at the proximal-end-side surface of the shutter main body and into which a first end of the coil spring is engaged, or an engagement groove which is formed at an outer surface of the shutter main body and into which the first end of the coil spring is engaged.

According to the configuration, it is possible to reliably increase the stored elasticity in the coil spring as the shutter member moves from the closing position to the opening position.

Further, it is possible to insert the pivot shaft into the bearing parts in a state where the first end of the coil spring is hold by the shutter main body, thereby effectively preventing the coil spring from falling off in the insertion process while easily positioning the coil spring, and therefore the assembly workability of the shutter member could be enhanced.

BRIEF DESCRIPTION OF THE DRAWINGS

FIG. 3 is an enlarged side view of vicinity of a section of the SC optical adapter shown in FIG. 2 where the shutter assembly is mounted.

FIG. 4 is a perspective view of the LC optical adapter to which the shutter assembly according to the one embodiment is mounted, and shows a state where the shutter member is positioned at the closing position.

DETAILED DESCRIPTION OF THE PREFERRED EMBODIMENTS

Hereinafter, one preferred embodiment of a shutter assembly according to the present invention will be described, with reference to the attached drawings. Firstly described is a configuration of an optical adapter to which the shutter assembly is mounted.

Firstly given is description of a configuration of an SC optical adapter.

Figure 10:
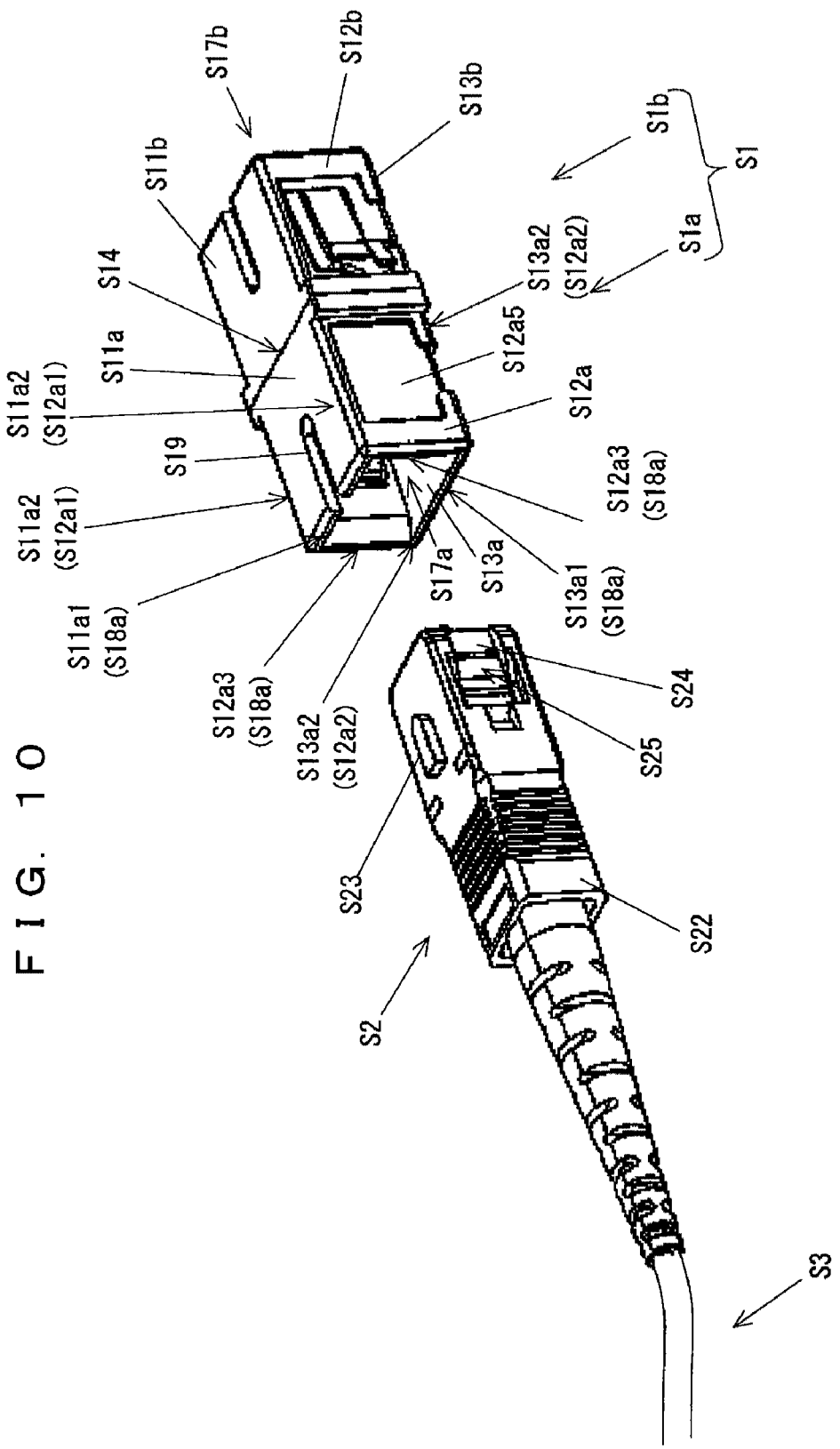
FIG. 10 is a perspective view of the SC optical adapter.
Figure 11:
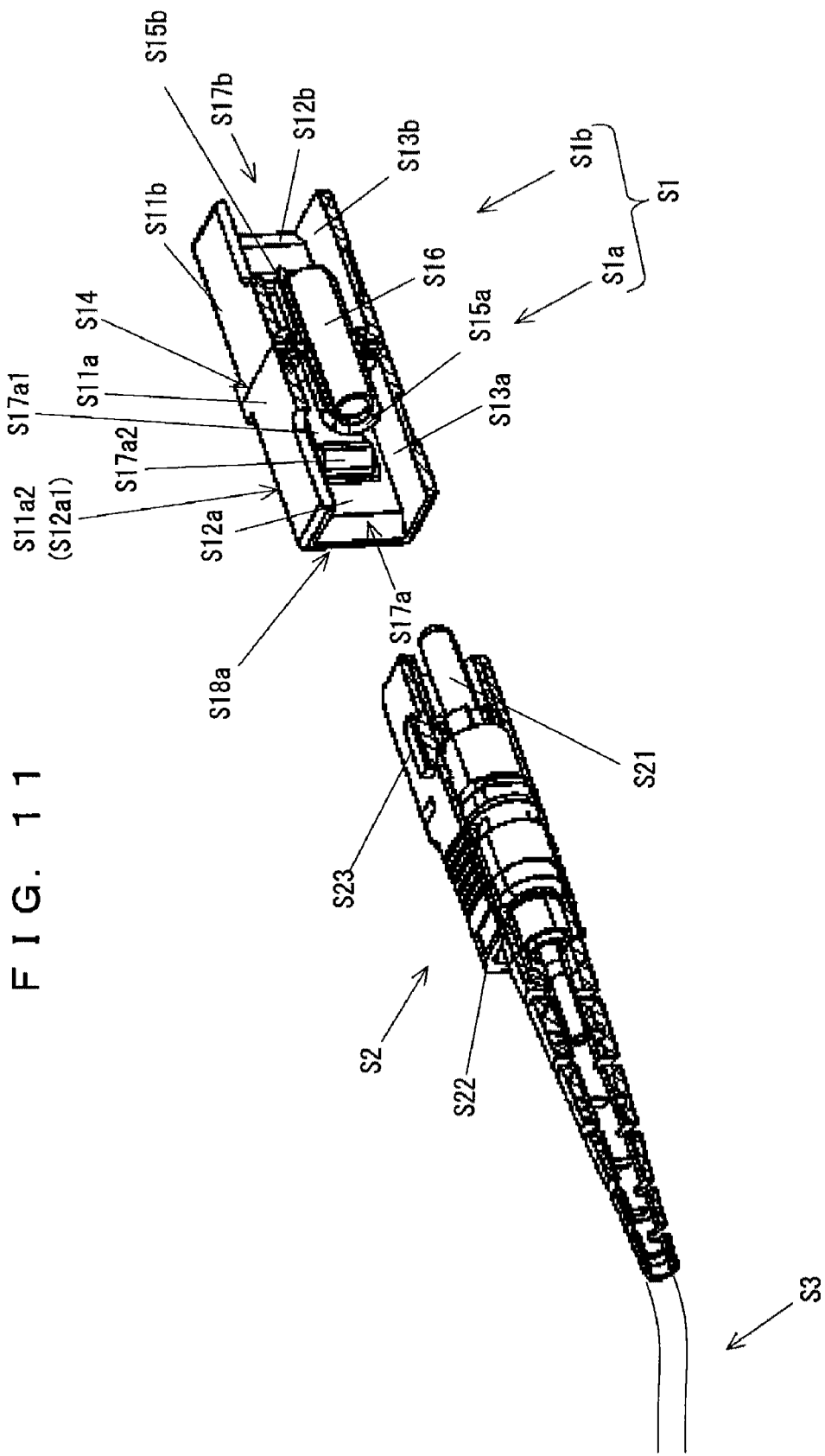
FIG. 11 is a perspective cross-sectional view of the SC optical adapter shown in FIG. 10, taken along its axial-line direction.

FIG. 10 is a perspective view of the SC optical adapter, and FIG. 11 is a perspective cross-sectional view of the SC optical adapter shown in FIG. 10, taken along its axial-line direction.

The SC optical adapter S1 is configured so that, as shown in FIGS. 10 and 11, a first optical cable S3 with an SC optical connector S2 provided on at least a first end side thereof is detachably coupled therewith.

In the present embodiment, the SC optical adapter S1 includes a first adapter housing S1a with which the first optical cable S3 with the optical connector S2 is coupled, and a second adapter housing S1b with which a second optical cable (constituted in a manner similar to the first optical cable S3 though not shown) is coupled. The first and second adapter housings S1a and S1b have an identical shape to each other.

More specifically, the first adapter housing S1a forming the first end side of the SC optical adapter SI is configured so that the first optical cable S3 with the SC optical connector S2 is detachably connected therewith, while the second adapter housing S1b forming the second end side of the SC optical adapter S1 is configured so that the second optical cable with the SC optical connector is detachably connected therewith.

The SC optical adapter S1 includes, as shown in FIGS. 10 and 11, an upper wall (including a first upper wall S11a of the first adapter housing S1a and a second upper wall S11b of the second adapter housing S1b), a pair of side walls (including first side walls S12a of the first adapter housing S1a and second side walls S12b of the second adapter housing S1b) respectively extending downward from both lateral-end-side edges of the upper wall S11, a bottom wall (including a first bottom wall S13a of the first adapter housing S1a and a second bottom wall S13b of the second adapter housing S1b) extending between lower-end-side edges of the pair of side walls S12a and S12b, an intermediate wall S14 provided at an intermediate portion in an axial-line direction of the SC optical adapter S1, a hollow boss section (including a first boss section S15a of the first adapter housing S1a and a second boss section S15b of the second adapter housing S1b) provided at the intermediate wall S14 so as to be along the axial-line direction, and a hollow sleeve S16 inserted into a hollow part of the boss section.

The first adapter housing S1a has an opening end S18a on first end sides of the first upper wall S11a, the first side walls S12a and the first bottom wall S13a, and an end wall (formed by the intermediate wall S14) on second end sides thereof, which are opposite to the first end sides. The first adapter housing S1 a forms a first accommodating section S17a which is inside the respective walls and in which the optical connector S2 can be housed. The first boss section S15a is provided on the end wall. In a similar manner, the second adapter housing S1b has an opening end S18b on first end sides of the second upper wall S11b, the second side walls S12b and the second bottom wall S13b, and an end wall (formed by the intermediate wall S14) on second end sides thereof, which are opposite to the first end sides. The second adapter housing S1b forms a second accommodating section S17b which is inside the respective walls and in which the optical connector S2 can be housed. The second boss section S15b is provided on the end wall.

The first and second adapter housings S1a and S1b are joined with each other in a state where outer surfaces of the end walls are brought into contact with each other, and also in a state where the first and second boss sections S15a and S15b are communicated with each other. The sleeve S16 is inserted into the first and second boss sections S15a and S15b that are communicated with each other.

The opening end S18a of the first accommodating section S17a of the SC optical adapter S1 (that is, the opening end of the first adapter housing S1a) is configured so that its first-end-side edge has a linear shape along a substantially perpendicular direction as viewed from the lateral side.

Specifically, the first upper wall S11a includes an opening-end-side edge (a first-end-side edge) S11a1 positioned on the side of the opening end S18a, and a pair of lateral-end-side edges S11a2 extending from both ends of the opening-end-side edge S11a1 toward the intermediate wall S14.

The first bottom wall S13a includes an opening-end-side edge (a first-end-side edge) S13a1 positioned on the side of the opening end S18a, and a pair of lateral-end-side edges S13a2 extending from both ends of the opening-end-side edge S13a1 toward the intermediate wall S14.

The pair of first side walls S12a each includes an upper-end-side edge S12a1 and a lower-end-side edge S12a2 respectively defined by the corresponding lateral-end-side edge S11a2 of the first upper wall S11a and the corresponding lateral-end-side edge S13a2 of the first bottom wall S13a, and an opening-end-side edge (a first-end-side edge) S12a3 which couples the first-end-side ends of the upper-end-side edge S12a1 and the lower-end-side edge S12a2.

The respective end-side edges forming the opening end S18a are substantially perpendicular to the axial-line direction of the SC optical adapter S1.

The first accommodating section S17a of the SC optical adapter S1 is positioned between the intermediate wall S14 and the opening end S18a. Further, the SC optical adapter S1 includes a pair of engagement pieces S17a1 formed in the first accommodating section S17a so as to be elastically deformable in a direction close to the side walls S12a, and engagement protrusions S17a2 formed on free ends of the engagement pieces S17a1. The engagement protrusion S17a2 is formed at a surface of the free end of the engagement piece S17a1, which is on a side opposite to the corresponding side wall S12a to which the engagement piece S17a1 is attached.

The engagement piece S17a1 is configured in such a manner that it is away from an inner-side surface of the corresponding side wall S12a to which the engagement piece S17a1 is provided as it comes close to the opening end from a center portion in the axial-line direction of the SC optical adapter S1. In other words, the engagement piece S17a1 is configured in such a manner as to be away from the inner-side surface of the corresponding side wall S12a to which the engagement piece S17a1 is attached as a distance to the free end of the engagement piece S1 7a1 where the engagement protrusion S17a2 is provided is reduced (that is, as it advances from its proximal end that is attached to the corresponding side wall S12a to its free end where the engagement protrusion S17a2 is provided).

By inserting the SC optical connector S2 into the first accommodating section S17a of the thus configured SC optical adapter S1, the first optical cable S3 in which a cable wire is coated with a coating can be connected to the SC optical adapter S1. The SC optical connector S2 includes a ferrule S21 externally mounted on the cable wire that is exposed on a side of an end where the first optical cable S3 is coupled with the SC optical adapter, an SC optical connector main body S22 which surrounds the ferrule S21, a guide piece S23 provided on an upper surface of the SC optical connector main body S22 so as to be along a direction where the optical connector is inserted into the SC optical adapter S1, engagement grooves S24 which are provided on both side surfaces of the SC optical connector main body S22, the engagement groove S24 engaging with the engagement protrusion S17a2 to elastically deform the engagement piece S17a1 of the SC optical adapter S1 to a direction close to the corresponding side wall S12a to which the engagement piece S17a1 is attached during the insertion of the optical connector into the SC optical adapter S1, and engagement recessed sections S25 for preventing the SC optical connector S2 from slipping out. Specifically, when the SC optical connector S2 is inserted to reach a coupling position where the ferrule S21 plunges into the sleeve S16, the engagement between the corresponding engagement groove S24 and the engagement protrusion S17a2 is released so that the engagement piece S17a1 moves by its stored elasticity in a direction away from the corresponding side wall S12a to which the engagement piece S17a1 is provided, and then, the engagement protrusion S17a2 is engaged with the corresponding engagement recessed section S25.

Further, the upper wall S11a of the SC optical adapter S1 is provided with a guide groove S19 which guides the guide piece S23 of the SC optical connector S2 along the axial-line direction from the opening-end-side edge S11a1 of the upper wall S11a.

In the thus configured structure, by inserting the SC optical connector main body S22 of the SC optical connector S2 into the first accommodating section S17a of the SC optical adapter S1 through the opening end S18a, the optical connector and adapter are connected to each other. At the insertion of the SC optical connector S2, the guide piece S23 of the SC optical connector S2 is engaged with the guide groove S19 of the SC optical adapter S1 so that the position of the SC optical connector S2 relative to the SC optical adapter S1 can be determined. Therefore, the first and second optical cables are respectively connected to the SC optical adapter S1 in such a manner as to face to each other, so that ferrules 21 thereof can be coaxially brought into contact with each other with a high accuracy.

Further, when the SC optical connector main body S22 is inserted into the first accommodating section S17a, the engagement protrusions S17a2 of the SC optical adapter S1 are engaged with the guide grooves S24 of the SC optical connector S2. During the insertion of the SC optical connector main body S22 into the first accommodating section S17a, tapered surfaces of the pair of engagement protrusions S17a2 elastically deform the pair of engagement pieces S17a1 of the SC optical adapter S1 so that the pair of engagement pieces S17a1 are away from each other in a right-left direction. When the SC optical connector main body S22 is inserted further inward so that the engagement recessed sections S25 of the SC optical connector S2 reach the positions of the engagement protrusions S17a2, the engagement between the engagement protrusions S17a and the guide grooves S24 is released. Therefore, the engagement protrusions S17a2 move toward the center in the right-left direction by the elasticity stored in the engagement pieces S17a1, and the engagement protrusions S17a2 are thereby engaged with the engagement recessed sections S25. As a result, the SC optical connector S2 can be prevented from unintentionally slipping out of the SC optical adapter S1.

At the time when the engagement protrusions S17a2 and the engagement recessed sections S25 are engaged with each other, a distal end of the ferrule S21 in the sleeve S16 is positioned slightly beyond the intermediate wall S14. Specifically, the ferrule S21 is movable in the axial-line direction relative to the SC optical connector S2 and is energized to the distal end side in the axial-line direction. That is, at the time when the first and second optical cables are connected to the SC optical adapter S1, the ferrules 21 thereof are brought into contact with each other in a state where the distal ends thereof are pushed toward each other, thereby reducing a loss in light transmission between the first and second optical cables in a state of being connected to each other as much as possible.

Surfaces of the respective engagement protrusions S17a2 with which the engagement recessed sections S25 are engaged (that is, the surfaces of the respective engagement protrusions S17a2 which are subjected to load when the SC optical connector main body S22 is pulled out of the SC optical adapter S1) also have a tapered shape. By this configuration, when applying a force, which is greater than a predetermined level in the direction where the SC optical connector main body S22 is pulled out of the SC optical adapter S1, on the SC optical connector main body S22, the engagement between the engagement protrusions S17a2 and the engagement recessed sections 25 is released.

Specifically, when the SC optical connector main body S22 is pulled out of the SC optical adapter S1, the engagement protrusions S17a2 elastically deform the engagement pieces S17a1 so that the engagement pieces S17a1 are away from each other in the right-left direction. At this state, when the force is further applied on the SC optical connector main body S22 in the direction where the SC optical connector main body S22 is pulled out of the SC optical adapter S1, the SC optical connector S2 can be drawn out of the SC optical adapter S1.

The above description is made by taking, as an example, a case where the first and second adapter housings S1a and S1b have the same shape. However, it is needless to say that the present invention is not necessarily limited thereto.

Next described is a configuration of an LC optical adapter.

Figure 12:
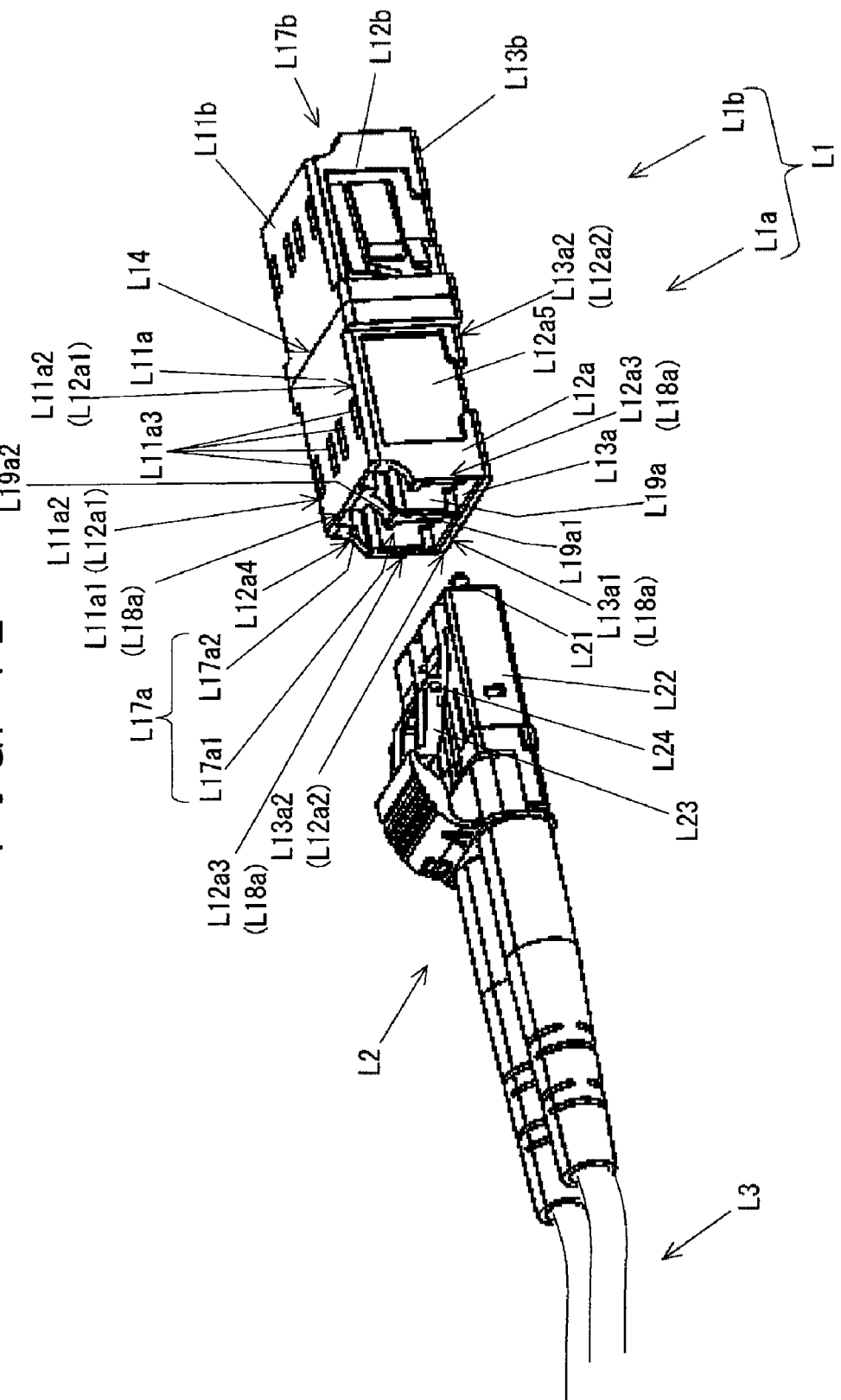
FIG. 12 is a perspective view of the LC optical adapter.
Figure 13:
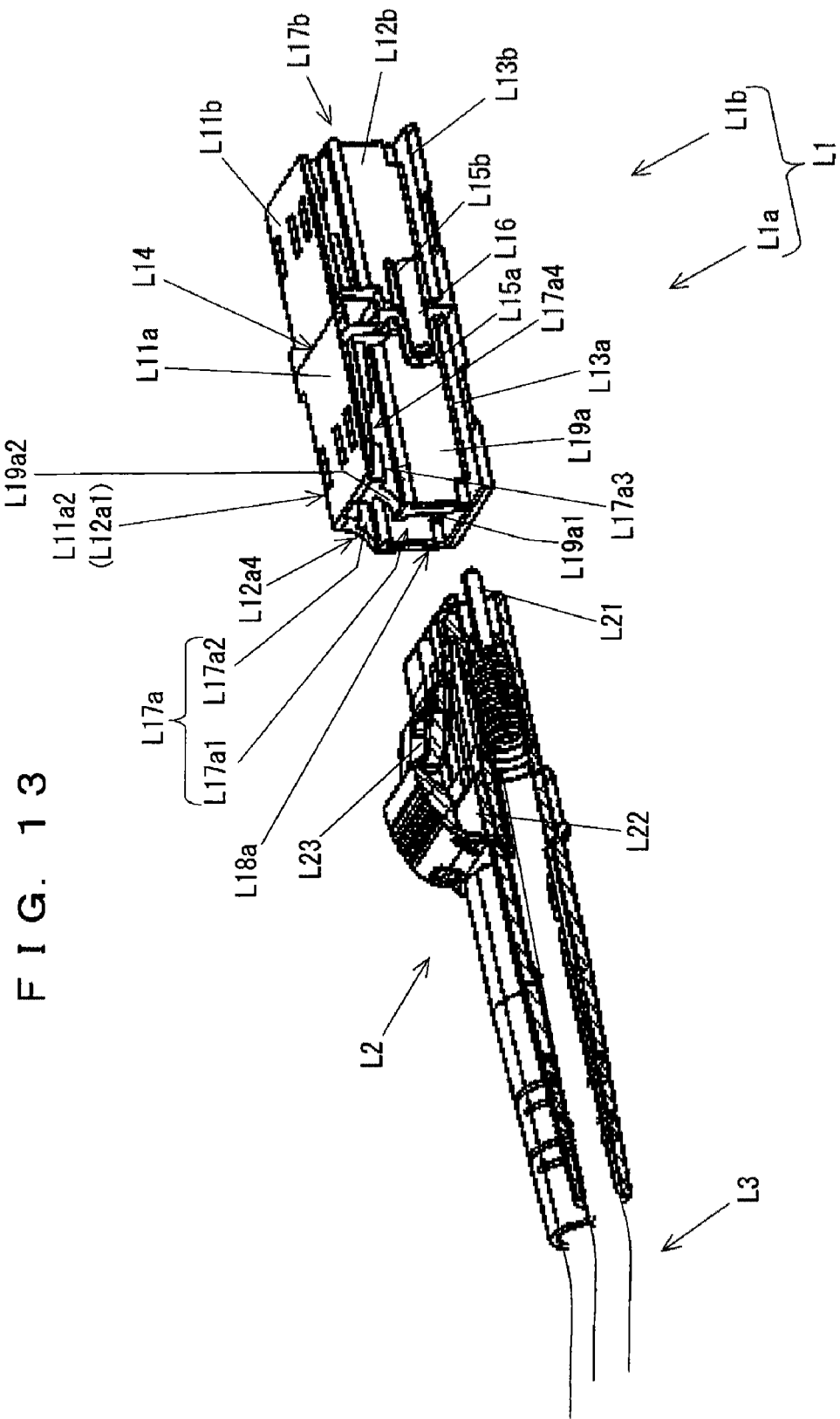
FIG. 13 is a perspective cross-sectional view of the LC optical adapter shown in FIG. 12, taken along its axial-line direction.

FIG. 12 is a perspective view of the LC optical adapter, and FIG. 13 is a perspective cross-sectional view of the LC optical adapter shown in FIG. 12, taken along its axial-line direction.

The LC optical adapter L1 is configured so that, as shown in FIGS. 12 and 13, a first optical cable L3 with an LC optical connector L2 provided on at least on a first end side thereof is detachably coupled therewith.

In the present embodiment, the LC optical adapter L1 includes a first adapter housing L1a with which the first optical cable L3 with the optical connector L2 is coupled, and a second adapter housing L1b with which a second optical cable (constituted in a manner similar to the first optical cable L3 though not shown) is coupled. The first and second adapter housings L1a and L1b have an identical shape.

More specifically, the first adapter housing L1a forming the first end side of the LC optical adapter L1 is configured so that the first optical cable L3 with the LC optical connector L2 is detachably connected therewith, while the second adapter housing L1b forming the second end side of the LC optical adapter L1 is configured so that the second optical cable with the LC optical connector (constituted in a manner similar to the first optical cable L3) is detachably connected therewith.

The LC optical adapter L1 includes, as shown in FIGS. 12 and 13, an upper wall (including a first upper wall L11a of the first adapter housing L1a and a second upper wall L11b of the second adapter housing L1b), a pair of side walls (including first side walls L12a of the first adapter housing L1a and second side walls L12b of the second adapter housing L1b) respectively extending downward from both lateral-end-side edges of the upper wall L11, a bottom wall (including a first bottom wall L13a of the first adapter housing L1a and a second bottom wall L13b of the second adapter housing L1b) extending between lower-end-side edges of the pair of side walls L12a and L12b, an intermediate wall L14 provided at an intermediate portion in an axial-line direction of the LC optical adapter L1, a hollow boss section (including a first boss section L15a of the first adapter housing L1a and a second boss section L15b of the second adapter housing L1b) provided at the intermediate wall L14 so as to be along the axial-line direction, and a hollow sleeve L16 inserted into a hollow part of the boss section.

The first adapter housing L1a has an opening end L18a on first end sides of the first upper wall L11a, the first side walls L12a and the first bottom wall L13a, and an end wall (formed by the intermediate wall L14) on second end sides thereof, which are opposite to the first end sides. The first adapter housing L1a forms a first accommodating section L17a which is inside the respective walls and in which the optical connector L2 can be housed. The first boss section L15a is integrally provided on the end wall. In a similar manner, the second adapter housing L1b has an opening end L18b on first end sides of the second upper wall L11b, the second side walls L12b and the second bottom wall L13b, and an end wall (formed by the intermediate wall L14) on second end sides thereof, which are opposite to the first end sides. The second adapter housing L1b forms a second accommodating section L17b which is inside the respective walls and in which the optical connector L2 can be housed. The second boss section L15b is integrally provided on the end wall. The first and second adapter housings L1a and L1b are joined with each other in a state where outer surfaces of the end walls are brought into contact with each other, and also in a state where the first and second boss sections L15a and L15b are communicated with each other. The sleeve L16 is inserted into the first and second boss sections L15a and L15b that are communicated with each other.

In the configuration shown in FIGS. 12 and 13, the first and second accommodating sections L17a and L17b are respectively divided into two accommodating spaces by center walls L19a. However, the present invention is not limited thereto, and the first and second accommodating sections L17a and L17b each may have only one accommodating space.

The opening end L18a of the first accommodating section L17a of the LC optical adapter L1 (that is, the opening end of the first adapter housing L1a) has a chamfered shape at upper corner portions thereof.

More specifically, the first upper wall L11a includes an opening-end-side edge (a first-end-side edge) L11a1 positioned on the side of the opening end L18a, and a pair of lateral-end-side edges L11a2 extending from both ends of the opening-end-side edge L11a1 toward the intermediate wall L14.

The first bottom wall L13a includes an opening-end-side edge (a first-end-side edge) L13a1 positioned on the side of the opening end L18a, and a pair of lateral-end-side end edges L13a2 extending from both ends of the opening-end-side edge L13a1 toward the intermediate wall L14.

The pair of first side walls L12a each includes an upper-end-side edge L12a1 and a lower-end-side edge L12a2 respectively defined by the corresponding lateral-end-side edge L11a2 of the first upper wall L11a and the lateral-end-side edge L13a2 of the first bottom wall S13a, and an opening-end-side edge (a first-end-side edge) L12a3 which couples the first-end-side ends of the upper-end-side edge L12a1 and the lower-end-side edge L12a2.

The opening-end-side edge L11a1 of the first upper wall L11a is positioned on the second end side (that is, on a side close to intermediate wall L14) than the opening-end-side edge of the first bottom wall L13a. The opening-end-side edges L12a3 of the pair of first side walls L12a (and the opening-end-side edge L19a1 of the center wall L19a which divides the first accommodating section L17a into two accommodating spaces) have upper regions L12a4 (and L19a2) including coupling portions which are adjacent to the upper wall L11a, each of the upper regions L12a4 (and L19a2) having a chamfered shape as viewed from the lateral side.

Specifically, in the present embodiment, each of the upper regions L12a4 and L19a2 have a recessed shape which is opened upward and toward the first end side.

More specifically, in the LC optical adapter L1, the first-end-side upper corner portions defined by the first-end-side edge L11a1 of the upper wall L11a and the first-end-side edges L12a3 and L19a2 of the pair of side walls L12a and the center wall L19a have a chamfered shape. According to the configuration, it is possible to easily attach and/or detach the LC optical connector L2 to and/or from the LC optical adapter L1.

By inserting the LC optical connector L2 into the first accommodating section L17a of the thus configured LC optical adapter L1, the first optical cable L3 in which a cable wire is coated with a coating can be connected to the LC optical adapter L1. The LC optical connector L2 includes a ferrule L21 externally mounted on the cable wire that is exposed on a side of an end where the first optical cable L3 is coupled with the LC optical adapter L1, an LC optical connector main body L22 which surrounds the ferrule L21, an engagement piece L23 having a proximal end fixed to an upper surface of the LC optical connector main body L22 so as to elastically deform in an up-and-down direction and a distal end extending from the proximal end toward a proximal end of the first optical cable L3 and also toward an upper side, and engagement protrusions L24 protruding laterally from the engagement piece L23.

In the configuration shown in FIGS. 12 and 13, the first accommodating section L17a of the first adapter housing L1a is divided into the two accommodating spaces as described above, and an optical cable integrally including two of the first optical cables L3 is inserted in such a manner that the two first optical cables L3 are respectively accommodated into the two accommodating spaces of the first accommodating section L17a in the LC optical connector L2. However, the present invention is not limited thereto. That is, the present invention could be applied to a configuration in which two of the first optical cables L3 may be separately inserted into the respective two accommodating spaces of the first accommodating section L17a in the LC optical connector L2. The alternative constitution can be similarly applied to the LC optical connector that is inserted into the second accommodating section L17b.

Specifically, the first accommodating section L17a of the LC optical adapter L1 includes a first space L17a1 which accepts the LC optical connector main body L22, and a second space L17a2 which accepts a part of the engagement piece L23 including the proximal end thereof. The second space L17a2 is provided with a guide surface L17a3 which guides the engagement protrusions L24 so that the engagement piece L23 is elastically deformed downward as the LC optical connector L2 is inserted further into the first space L17a1 from outside and releases the engagement with the engagement protrusions L24 when the LC optical connector L2 is inserted to reach a coupling position at which the ferrule L21 plunges into the sleeve L16, and an engagement surface L17a4 extending upward from an inner-side end of the guide surface L17a3. When the LC optical connector L2 reaches the coupling position, the engagement between the guide surface L17a3 and the engagement protrusions L24 is released. Therefore, the engagement piece L23 moves upward by its stored elasticity, and the engagement protrusions L24 accordingly move upward so as to be engaged with the engagement surface L17a4, which prevents the LC optical connector L2 from slipping out.

In the thus configured structure, by inserting the LC optical connector main body L22 of the LC optical connector L2 into the first accommodating section L17a through the opening end L18a of the LC optical adapter L1, the optical connector and the adapter are connected to each other.

Specifically, the position of the LC optical connector L2 relative to the LC optical adapter L1 is determined by inserting the LC optical connector main body L22 into the first space L17a1 of the first accommodating section L17a. At the same time, the engagement piece L23 of the LC optical connector L2 is inserted into the second space L17a2 of the first accommodating section L17a, and the engagement protrusions 24 provided in the engagement piece L23 are engaged with the guide surface L17a3 provided in the second space L17a2. The guide surface L17a3 has such a tapered surface as that it is away from the upper wall L11a of the LC optical adapter L1 as a distance from the opening end L18a is increased. Accordingly, as the LC optical connector L2 is inserted into the LC optical adapter L1, the guide surface L17a3 elastically deforms the engagement piece L23 in a direction close to the axial-line center through the engagement protrusions L24.

When the LC optical connector L2 is inserted further inward and then the engagement protrusions L24 reach the position of the engagement surface L17a4 of the LC optical adapter L1, the engagement protrusions L24 move in direction away from the axial-line center by an elasticity stored in the engagement piece L23 since the engagement between the engagement protrusions L24 and the guide surface L17a3 is released. Accordingly, the engagement protrusions L24 are engaged with the engagement surface L17a4, which prevents the LC optical connector L2 from slipping out of the LC optical adapter L1.

At the time when the engagement protrusions L24 and the engagement surface L17a4 are engaged with each other, a distal end of the ferrule L21 in the sleeve L16 is positioned slightly beyond the intermediate wall L14. Specifically, the ferrule L21 is movable in the axial-line direction relative to the LC optical connector L2 and is energized to the distal end side in the axial-line direction. That is, at the time when the first and second cables are connected to the LC optical adapter L1, the ferrules 21 thereof are brought into contact with each other in a state where the distal ends thereof are pushed toward each other, thereby reducing a loss in light transmission between the first and second optical cables in a state of being connected to each other as much as possible.

Further, even at the time when the engagement protrusions L24 and the engagement surface L17a4 are engaged with each other, the engagement protrusions L24 press the inner surface of the upper-wall-L11a of the first accommodating section S17a by the elasticity stored in the engagement piece L23. That is, the reaction force which is created by the pressing force of the engagement protrusions L24 against the upper-wall-L11a energizes the ferrules L21 in a downward direction within the sleeve L16 so that the ferrules L21 of the first and second optical cables are eccentric in the same direction with respect to the axial center of the sleeve L16. In other words, according to the configuration, the first and second optical cables are connected to each other in a state of being eccentric in the same direction. Accordingly, they can be placed at the same position without any axial shift of axial centers of the respective ferrules L21.

The disengagement of the LC optical connector L2 from the LC optical adapter L1 is achieved by pushing the engagement piece L23 in a direction closed to the axial-line center so that the engagement between the engagement protrusions L24 and the engagement surface L17a4 is released. That is, it is possible to detach the LC optical connector L2 from the LC optical adapter L1 by pulling the LC optical connector L2 out of the LC optical adapter L1 while pushing the engagement piece L23 in the direction close to the axial-line center.

The explanation of the present embodiment is made by taking, as an example, a case where the first and second adapter housings L1a and L1b have the same shape. However, the present invention is not limited thereto.

Figure 14:
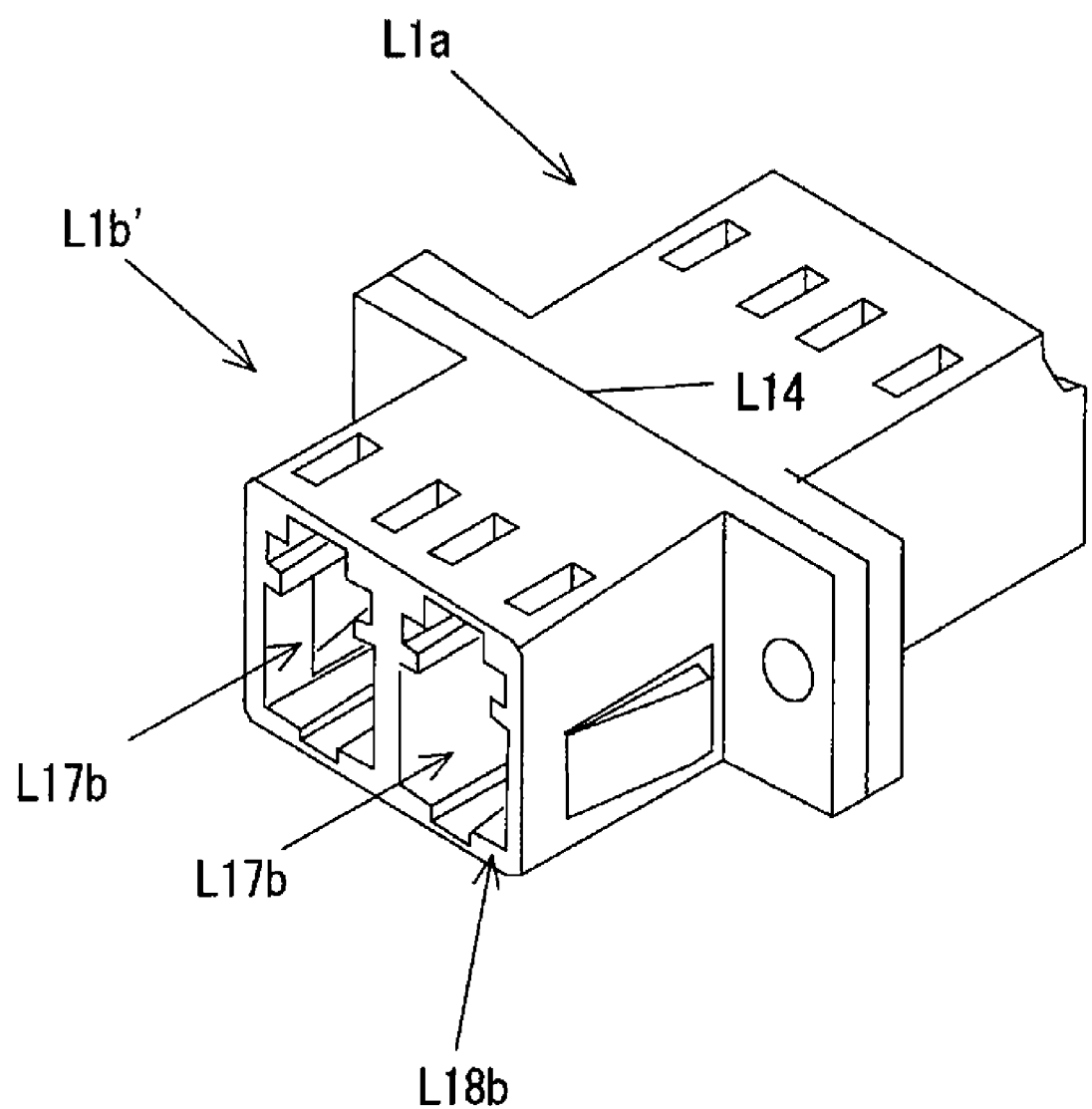
FIG. 14 is a perspective view of a modified example of the LC optical adapter in which a small-size optical adapter housing is used as a second adapter housing of the LC optical adapter shown in FIG. 12.

For example, a small-size optical adapter L1b' shown in FIG. 14 may be used as the second adapter housing. The small-size optical adapter L1b' is configured so that a distance between the opening end L18b and the intermediate wall L14 is shorter than that of the optical adapter housing L1b.

Next described is one embodiment of the shutter assembly according to the present invention, which is capable of being mounted on both the SC and LC optical adapters S1 and L1 described above.

Figure 1:
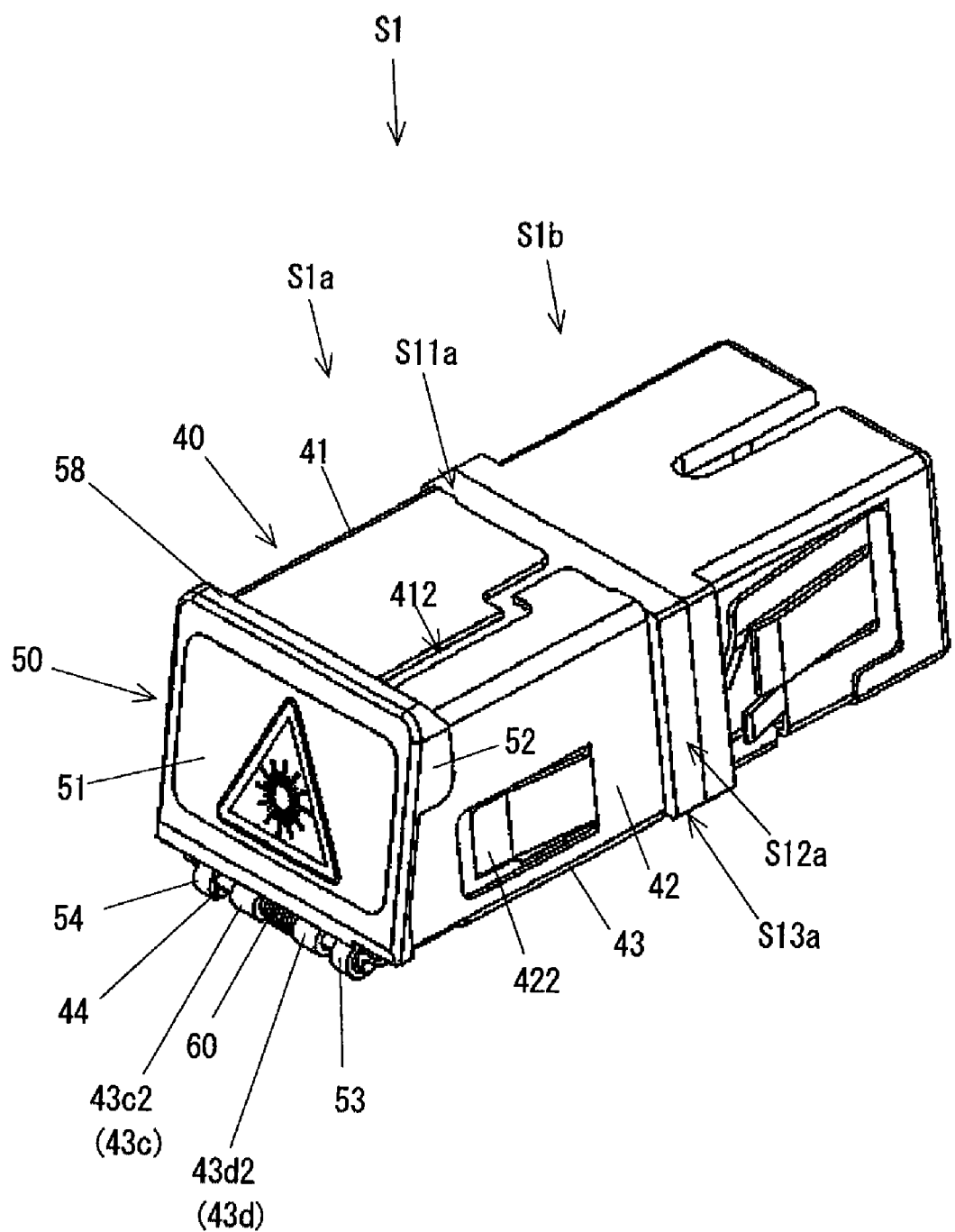
FIG. 1 is a perspective view of the SC optical adapter to which a shutter assembly according to one embodiment of the present invention is mounted, and shows a state where a shutter member of the shutter assembly is positioned at a closing position.
Figure 2:
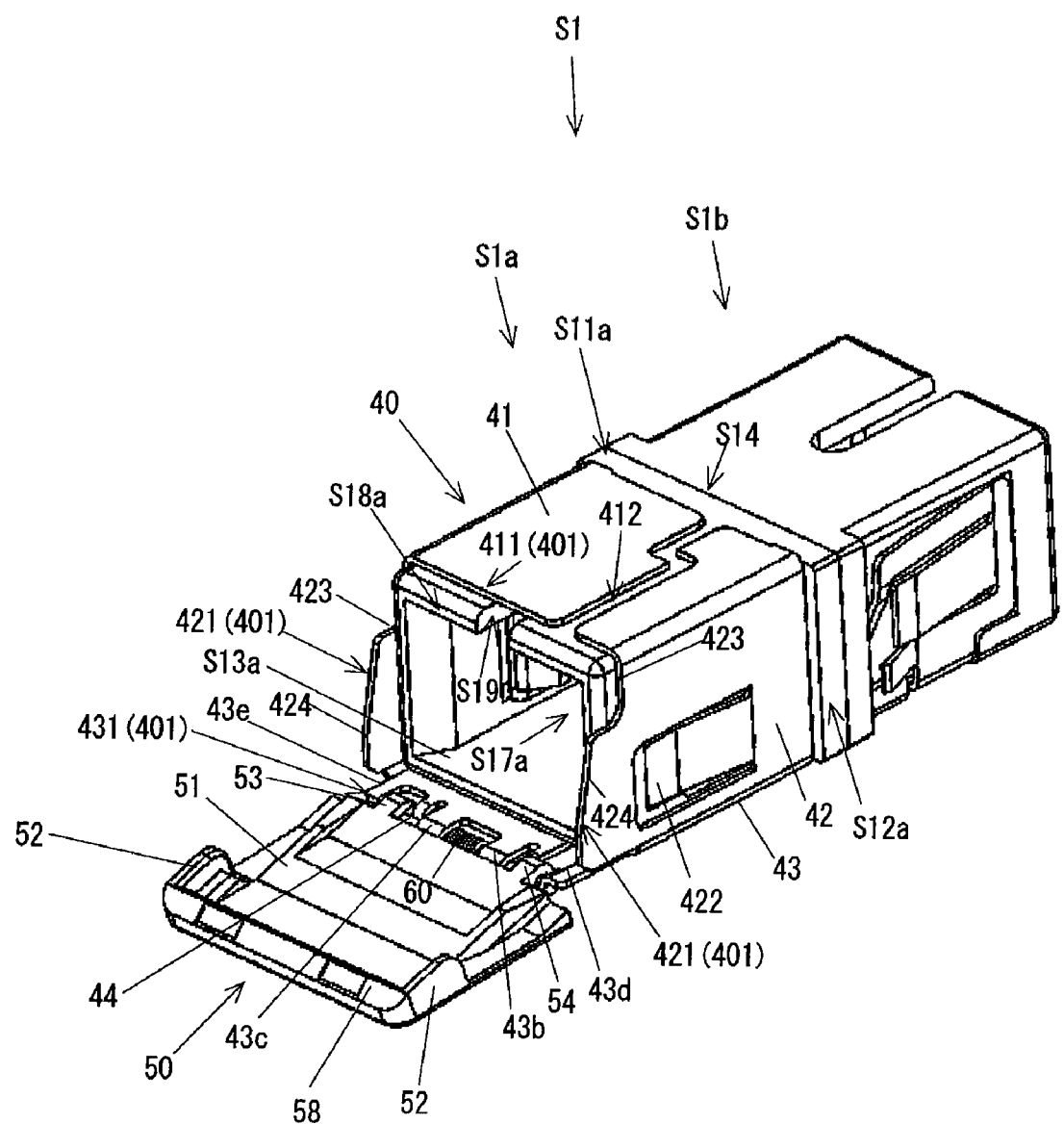
FIG. 2 is a perspective view of the SC optical adapter to which the shutter assembly according to the one embodiment is mounted, and shows a state where the shutter member is positioned at an opening position.

FIGS. 1 and 2 are perspective views of the SC optical adapter to which the shutter assembly according to the present embodiment is mounted. FIG. 1 shows a state where a shutter member of the shutter assembly is positioned at a closing position, and FIG. 2 shows a state where the shutter member is positioned at an opening position. FIG. 3 is an enlarged side view of vicinity of a section of the SC optical adapter shown in FIG. 2 where the shutter assembly is mounted.

Figure 5:
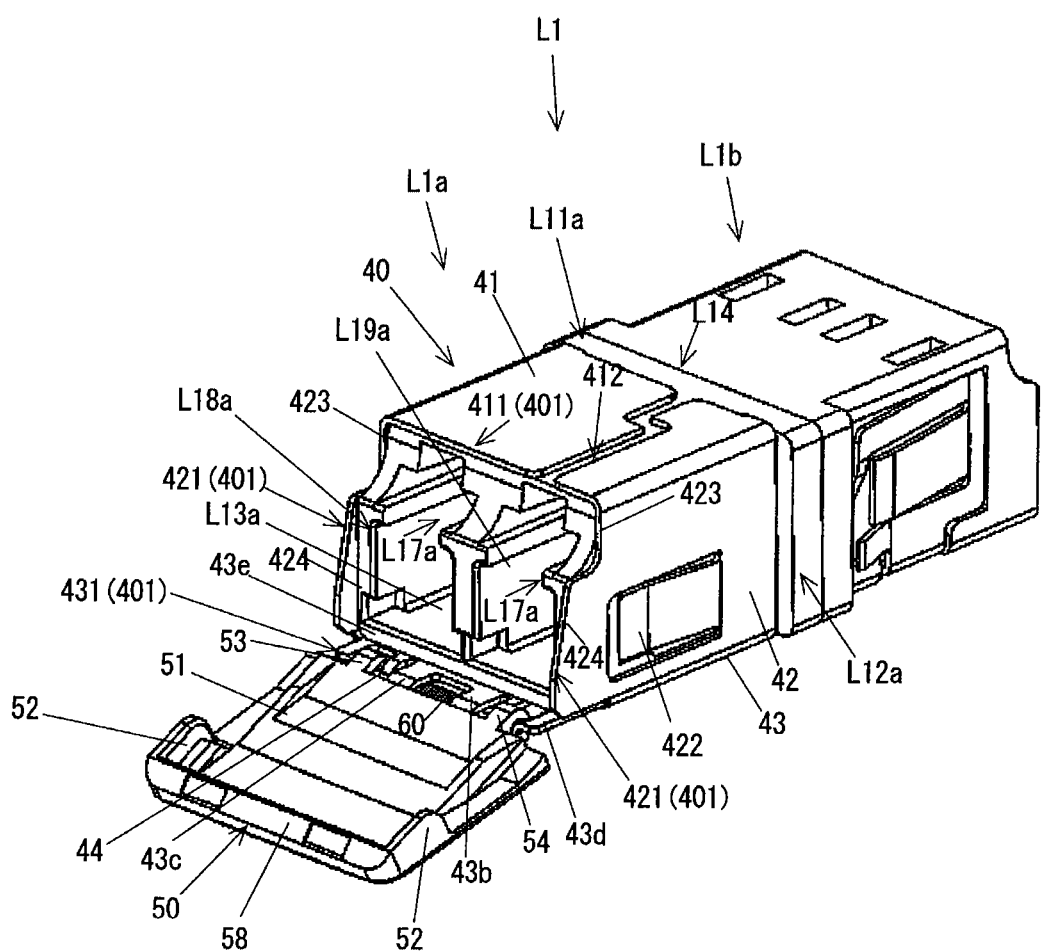
FIG. 5 is a perspective views of the LC optical adapter to which the shutter assembly according to the one embodiment is mounted, and shows a state where the shutter member is positioned at the opening position.
Figure 6:
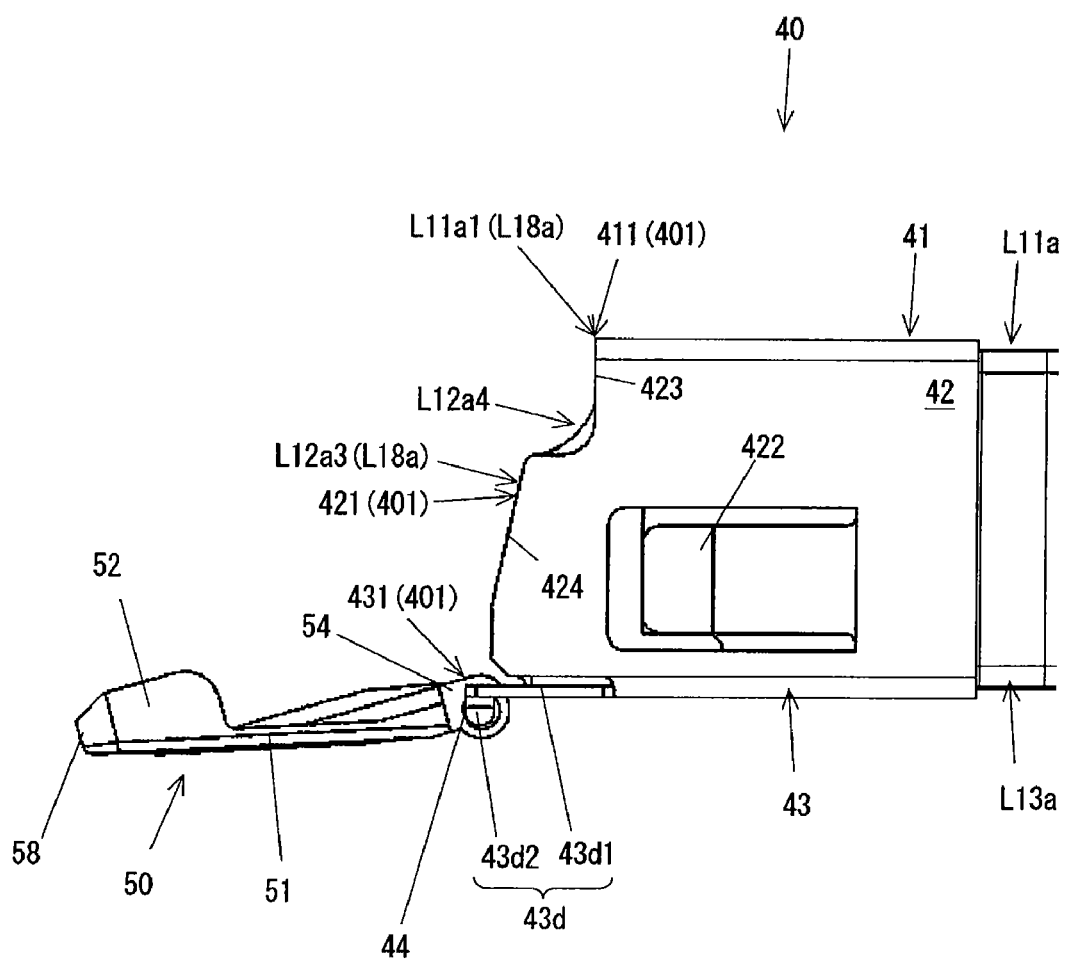
FIG. 6 is an enlarged side view of vicinity of a portion of the LC optical adapter shown in FIG. 5 where the shutter assembly is mounted.

Similarly, FIGS. 4 and 5 are perspective views of the LC optical adapter to which the shutter assembly according to the present embodiment is mounted. FIG. 4 shows a state where the shutter member is positioned at the closing position, and FIG. 5 shows a state where the shutter member is positioned at the opening position. FIG. 6 is an enlarged side view of vicinity of a portion of the LC optical adapter shown in FIG. 5 where the shutter assembly is mounted.

As shown in FIGS. 1 to 6, the shutter assembly according to the present embodiment includes a shutter housing 40 detachably mounted on a first end side of the optical adapter S1 or L1 so as to surround the optical adapter S1 or L1, the shutter housing 40 having an upper-surface section 41, a pair of side-surface sections 42 and a bottom-surface section 43 respectively brought into contact with the outer surfaces of the first upper wall S11a or L11a, the pair of first side walls S12a or L12a and the first bottom wall S13a or L13a of the SC optical adapter S1 or the LC optical adapter L1; a shutter member 50 coupled in a swingable manner with a first-end-side edge 431 of the bottom-surface section 43 via a pivot shaft 44 so as to open or close a first-end-side opening 401 of the shutter housing 40 which is defined by first-end-side edges 411, 421 and 431 of the upper-surface section 41, the pair of side-surface sections 42 and the bottom-surface section 43; and a coil spring 60 which energizes the shutter member 50 in such a direction as that the shutter member 50 closes the first-end-side opening 401 of the shutter housing 40. In the present embodiment, the shutter member 50 closes the first-end-side opening 401 of the shutter housing 40 in a state where the shutter housing 40 is mounted on the optical adapter S1 or L1, so that the opening end S18a or L18a of the first accommodating section S17a or L17a of the optical adapter S1 or L1 could be closed.

According to the thus configured shutter assembly, as shown in FIGS. 1 to 6, the shutter housing 40 is detachably mounted on the side of the first adapter housing S1a or L1a of the optical adapter S1 or L1 so as to surround the optical adapter S1 or L1. In a state where the shutter housing 40 is mounted on the side of the first adapter housing S1a or L1a of the optical adapter S1 or L1, the upper-surface section 41, the pair of side-surface sections 42 and the bottom-surface section 43 of the shutter housing 40 respectively are brought into contact with the outer surfaces of the first upper wall S11a or L11a, the pair of first side walls S12a or L12a and the first bottom wall S13a or L13a of the optical adapter S1 or L1. In the present embodiment, the pair of side walls S12a or L12a are provided with a pair of recessed sections S12a5 or L12a5 (see FIGS. 10 and 13), while the side-surface sections 42 are provided with a pair of engagement pieces 422 extending inward of the pair of side-surface sections 42 and also towards the first-end-side opening 401 of the shutter housing 40. The pair of engagement pieces 422 is configured so as to be engaged with the pair of recessed sections S12a5 or L12a5 in a state where the shutter housing 40 of the shutter assembly is mounted on the first end side of the optical adapter S1 or L1 so as to surround the optical adapter S1 or L1, thereby preventing the shutter housing 40 from unintentionally slipping out of the optical adapter S1 or L1.

As described above, the shutter member 50 is coupled in a swingable manner with the first-end-side edge 431 of the bottom-surface section 43 of the shutter housing 40 via the pivot shaft 44. That is, the shutter member 50 swings around the pivot shaft 44 so that the first-end-side opening 401 of the shutter housing 40 is opened or closed. Specifically, the shutter member 50 is energized by the coil spring 60 in a direction where the shutter member 50 closes the first-end-side opening 401 of the shutter housing 40. By positioning the shutter member 50 at the opening position against the energizing force of the coil spring 60 in a state where the shutter housing 40 is mounted on the optical adapter S1 or L1, it is achieved a state where the optical connector S2 or L2 can be inserted into the first accommodating section S17a or L17a of the optical adapter S1 or L1 for connecting the corresponding optical connector S2 or L2 to the optical adapter S1 or L1. When the connected optical connector S2 or L2 which has been connected with the corresponding adapter S1 or L1 is entirely pulled out of the adapter, an elasticity stored in the coil spring 60 makes the shutter member 50 automatically return to the closing position at which the first-end-side opening 401 of the shutter housing 40 is closed. The shutter member 50 closes the first-end-side opening 401 of the shutter housing 40 so that the opening end S18a or L18a of the first accommodating section S17a or L17a in the optical adapter S1 or L1 is closed.

Since the shutter assembly according to the present embodiment is configured so that the shutter member 50 is mounted in a swingable manner to the shutter housing 40 that is detachably mounted on the optical adapter S1 or L1 so as to surround the optical adapter S1 or L1, it is possible to easily provide the shutter member 50 in either of the SC and LC optical adapters S1 and L1 only by mounting the shutter housing 40 on the corresponding optical adapter irrespective of the SC or LC type. Accordingly, it is possible to eliminate the need for designing a dedicated shutter member for the type of the optical adapter. That is, it is possible to use a common shutter member 50 for both the optical adapters S1 and L1, and then commonly use the die for manufacturing the common shutter member 50. Therefore, designing labors and manufacturing costs can be effectively reduced.

Furthermore, the shutter assembly according to the present embodiment could be mounted on an existed optical adapter S1 or L1 which is not provided with a shutter member, thereby easily providing the existed optical adapter with a shutter mechanism.

In the present embodiment, the shutter member 50 is integrally formed from resin. The shutter housing 40 is formed by performing a bending process on a metal sheet such as aluminum.

In the present embodiment, the upper-surface section 41 of the shutter housing 40 is provided with an fastening-adjustable slit 412 so that the shutter housing 40 can be mounted on the optical adapter S1 or L1 even if there is variability in dimensions of the optical adapter S1 or L1 due to manufacturing errors and the like. The slit 412 is preferably positioned so as to avoid the guide groove S19 in the SC optical adapter S1 and holes L11a3 for pulling out the die used in manufacturing the LC optical adapter L1. The preferable configuration makes it possible to enhance a light blocking effect and dust resistance in a state where the shutter housing 40 is mounted on the optical adapter S1 or L1.

Below given is more detailed description of the shutter assembly.

In the shutter assembly according to the present embodiment, the first-end-side edge 411 of the upper-surface section 41 is positioned more inward in the axial-line direction of the shutter housing 40 than the first-end-side edge 431 of the bottom-surface section 43 as shown in FIGS. 3 and 6.

Further, as shown in FIGS. 5 and 6, the first-end-side edges 421 of the side-surface sections 42 each includes an upper region 423 having a shape corresponding to the chamfered shape of the first-end-side upper corner portion in the LC optical adapter L1 (that is, the upper region L12a4 of the first side wall L12a3), and a lower region 424 extending downward from the upper region 423. With a state where the shutter housing 40 is mounted on the LC optical adapter L1 as a reference, the first-end-side edge 411 of the upper-surface section 41 is positioned at substantially the same position as the first-end-side edge L11a1 of the first upper wall L11a, the first-end-side edge 431 of the bottom-surface section 43 is positioned outward than the first-end-side edge L13a1 of the first bottom wall L13a, the upper regions 423 of the side-surface sections 42 are positioned at substantially the same position as the corresponding chamfered portions (the upper regions L12a4) in the first-end-side upper corner portion in the LC optical adapter L1, and the lower regions 424 are positioned outward than the first-end-side edges L12a1 of the first side walls L12a in the LC optical adapter L1.

Further, as shown in FIGS. 2 and 3, with a state where the shutter housing 40 is mounted on the SC optical adapter S1 as a reference, the first-end-side edge 411 of the upper-surface section 41 is positioned inward than the first-end-side edge S11a1 of the first upper wall S11a of the SC optical adapter S1, the first-end-side edge 431 of the bottom-surface section 43 is positioned outward than the first-end-side edge S13a1 of the first bottom wall S13a, and the lower regions 424 are positioned outward than the first-end-side edges S12a1 of the first side walls S12a of the SC optical adapter S1.

The shutter member 50 includes a plate-like shaped shutter main body 51 supported in a swingable manner by the first-end-side edge 431 of the bottom-surface section 43, and a pair of ribs 52 extending in a direction substantially orthogonal to the shutter main body 51 from a part of both lateral-side ends of the shutter main body 51. In either case where the shutter housing 40 is mounted on the LC optical adapter L1 or the SC optical adapter S1, when the shutter member 50 is positioned at the closing position, the ribs 52 are brought into contact with the first-end-side edges of the upper regions 423 (the chamfered parts of the first-end-side edges 421 of the side-surface sections 42) in a state where an inner peripheral surface of the shutter main body 51 is brought into contact with first-end-side edges of the lower regions 424 (linear parts in the first-end-side edges 421 of the side-surface sections 42).

As described above, the shutter member 50 has a following configuration. The plate-like shaped shutter main body 51 is supported in a swingable manner by the first-end-side edge 431 of the bottom-surface section 43 in the shutter housing 40, and the pair of ribs 52 is extending in the direction substantially orthogonal to the shutter main body 51 from a part of the both lateral-side ends of the shutter main body 51.

Furthermore, in a state where the shutter housing 40 is mounted on the LC optical adapter L1 in which its first-end-side upper corner portions (the upper regions L12a4 of the first-end-side edges L12a1 of the side walls L12a) have a chamfered shape as viewed from the lateral side, the first-end-side edge 411 of the upper-surface section 41 in the shutter housing 40 is positioned at substantially the same position as the first-end-side edge L11a1 of the first upper wall L11a in the LC optical adapter L1, and the first-end-side edge 431 of the bottom-surface section 43 of the shutter housing 40 is positioned outward than the first-end-side edge L13a1 of the first bottom wall L13a in the LC optical adapter L1, as shown in FIGS. 4 to 6.

Furthermore, the upper region 423 of the side-surface section 42 in the shutter housing 40 has a shape corresponding to the chamfered shape of the first-end-side upper corner portion (upper region L12a4 of the first side wall L12a) in the LC optical adapter L1. That is, in a state where the shutter housing 40 is mounted on the LC optical adapter L1, the upper regions 423 of the side-surface sections 42 in the shutter housing 40 are positioned at substantially the same positions as the chamfered portions in the first-end-side upper corner portions L12a4 in the LC optical adapter L1. In this state, the lower regions 424 of the side-surface sections 42 in the shutter housing 40 are positioned outward than the first-end-side edges L12a1 of the first side walls L12a in the LC optical adapter L1.

In the shutter assembly according to the present embodiment, the first-end-side upper corner portions L12a4 of the LC optical adapter L1 having the chamfered portions are not blocked by the side-surface sections 42 of the shutter housing 40. That is, in a state where the shutter housing 40 is mounted on the LC optical adapter L1, the chamfered shape of the first-end-side upper corner portions L12a4 in the LC optical adapter L1 is substantially unchanged. Therefore, it is possible to easily press the engagement piece L23 of the LC optical connector L2 to the axial center of the connector when the LC optical connector L2 is pulled out of the LC optical adapter L1 even in a state where the shutter assembly is mounted.

In a state where the shutter housing 40 is mounted on the SC optical adapter S1 in which the opening end S18a as viewed from the lateral side has a linear shape along the substantially perpendicular direction, the first-end-side edge 411 of the upper-surface section 41 in the shutter housing 40 is positioned inward than the first-end-side edge S11a1 of the first upper wall S11a in the SC optical adapter S1, and the first-end-side edge 431 of the bottom-surface section 43 in the shutter housing 40 is positioned outward than the first-end-side edge S13a1 of the first bottom wall S13a in the SC optical adapter S1. Further, the lower regions 424 of the side-surface sections 42 in the shutter housing 40 are positioned outward than the first-end-side edges S12a of the first side walls S12 in the SC optical adapter S1, as shown in FIGS. 1 to 3.

More specifically, the shutter housing 40 is configured so that the first-end-side edge 431 of the bottom-surface section 43 and the lower regions 424 in the first-end-side edges 421 of the side-surface sections 42 are positioned outward in the axial-line direction than the SC optical adapter S1 or the LC optical adapter L1 in either case that the shutter housing 40 is mounted on the SC optical adapter S1 or the LC optical adapter L1.

Further, the shutter member 50 is energized by the energizing force of the coil spring 60 in a direction where the shutter member 50 closes the first-end-side opening 401 of the shutter housing 40 in a state of being supported in a swingable manner by the first-end-side edge 431 of the bottom-surface section 43.

Therefore, the inner surface of the shutter member 50 is brought into contact with the lower regions 424 in the first-end-side edges 421 of the side-surface sections 42 in the shutter housing 40 so that the opening end S18a or L18a of the SC optical adapter S1 or the LC optical adapter L1 is reliably closed in either case that the shutter housing 40 is mounted on the SC optical adapter S1 or the LC optical adapter L1.

In the present embodiment, when the shutter member 50 is positioned at the closing position, the ribs 52 are brought into contact with the upper regions 423 of the shutter housing 40 in a state where the inner surface of the shutter main body 51 is brought into contact with the lower regions 424 of the shutter housing 40 regardless whether the shutter housing 40 is mounted on the SC optical adapter S1 or the LC optical adapter L1. More specifically, the entire region of the first-end-side edges of the side-surface sections 42 in the shutter housing 40 and the shutter member 50 are brought into contact with each other so that the opening end S18a or L18a of the optical adapter S1 or L1 is closed without any gap therebetween regardless whether the shutter housing 40 is mounted on the SC optical adapter S1 or the LC optical adapter L1.

As described above, the shutter housing 40 is formed so as to have a shape corresponding to the chamfered shape in the LC optical adapter L1, and the ribs 52 having a shape corresponding to the chamfered shape are provided in the shutter member 50. Accordingly, when the shutter member 40 is mounted on the LC optical adapter L1, the shape of the chamfered portion provided in the LC optical adapter L1 can be effectively utilized to facilitate the connection and release of the optical cable L3. Further, the opening end S18a or L18a of the optical adapter S1 or L1 can be completely closed by the shutter member 50 regardless whether the shutter housing 40 is mounted on the SC optical adapter S1 or the LC optical adapter L1.

In the present embodiment, the shutter member 50 is further provided with an upper-side rib 58 on its free-end-side end, the upper-side rib 58 being formed to be continued from the ribs 52. In the configuration, when the shutter member 50 is positioned at the closing position, at least one of the upper-side rib 58 or the pair of ribs 52 may be brought into contact with the corresponding portion of the shutter housing 40 as well as the inner surface of the shutter member 50 is brought into contact with the lower regions 424.

For example, when the shutter member 50 is positioned at the closing position, the upper-side rib 58 may be brought into contact with the upper-surface section 41 in the shutter housing 40 in addition to the contact of the inner surface of the shutter member 50 with the lower regions 424. In this case, the pair of ribs 52 may be configured so as to be brought into contact with the upper regions 423 of the shutter housing 40, or so as to surround the upper regions 423 of the housing 40.

A connecting structure between the shutter housing 40 and the shutter member 50 is now more specifically described.

Figure 7:
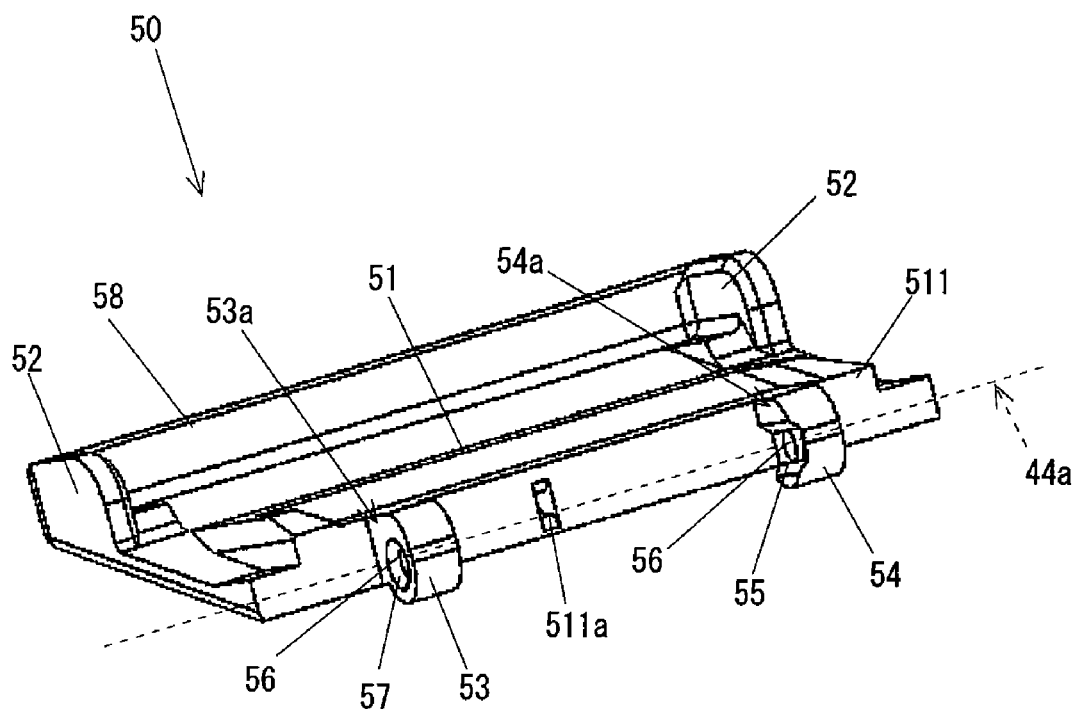
FIG. 7 is a perspective view of the shutter member in the shutter assembly according to the one embodiment.
Figure 8:
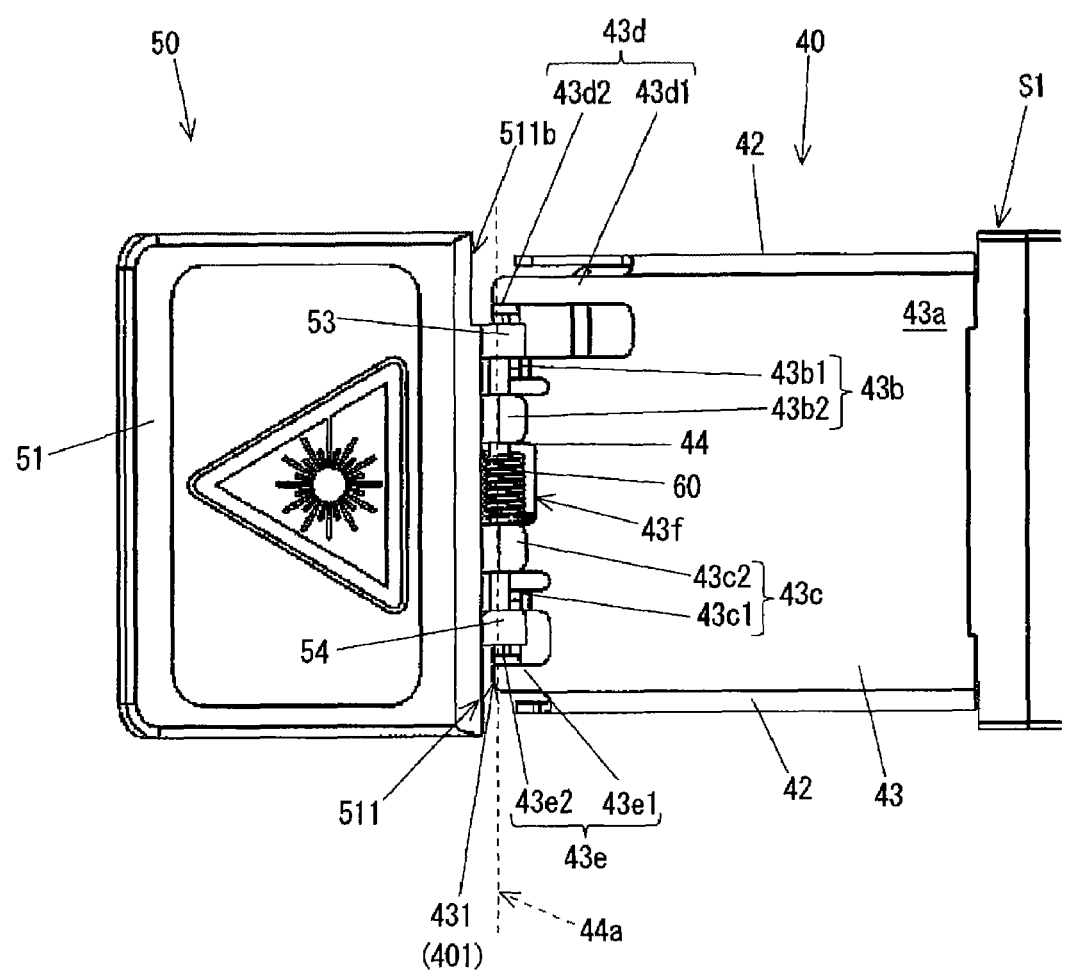
FIG. 8 is a bottom view of the shutter assembly shown in FIG. 2 in a state where the shutter member is positioned at the opening position.
Figure 9:
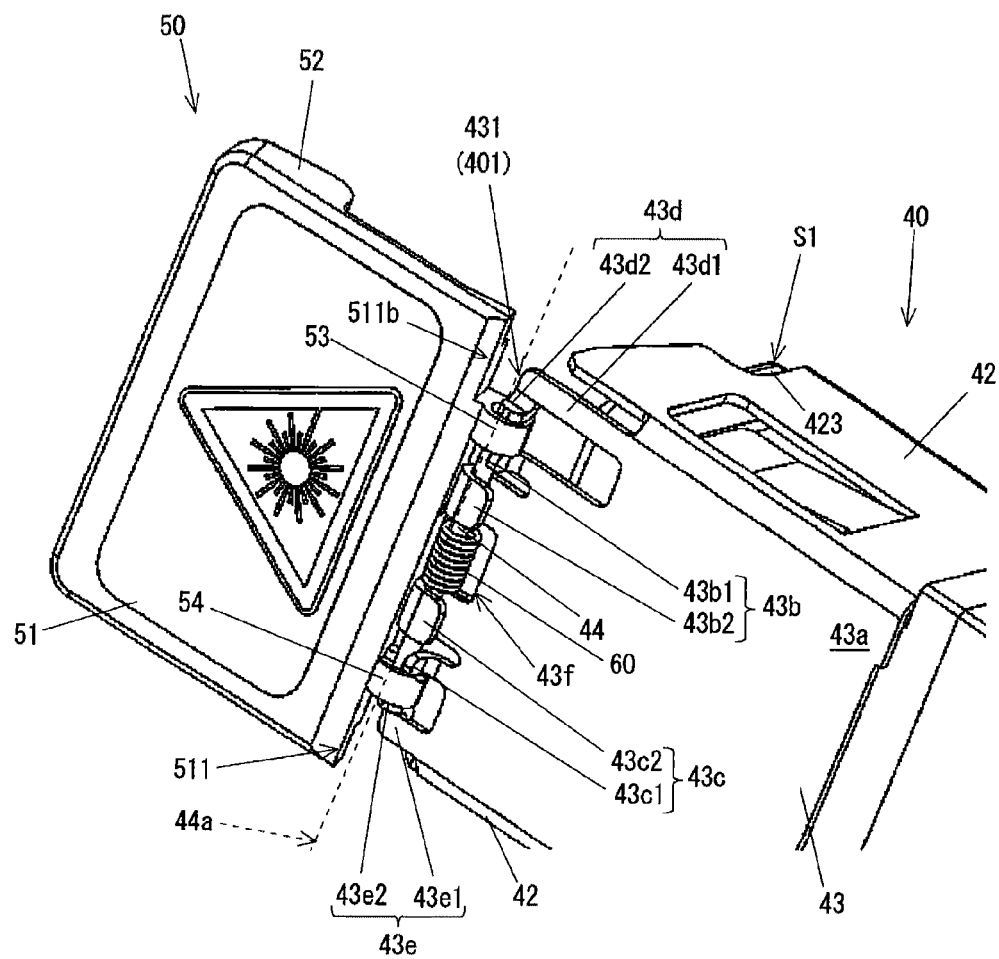
FIG. 9 is a perspective bottom view of the shutter assembly shown in FIG. 2 in a state where the shutter member is positioned at the opening position.

FIG. 7 is a perspective view of the shutter member 50 of the shutter assembly according to the present embodiment. FIGS. 8 and 9 are respectively a bottom view and a perspective bottom view of the shutter assembly shown in FIG. 2, in a state where the shutter member 50 is positioned at the opening position. FIGS. 7 to 9 show, as an example, a case where the shutter assembly is mounted on the SC optical adapter S1, and a description given below relates to the example. The description is also applied to a case where the shutter assembly is mounted on the LC optical adapter L1.

In the present embodiment, the shutter member 50 includes a pair of first and second bearing parts 53 and 54 through which the pivot shaft 44 is inserted, the first and second bearing parts 53 and 54 being integrally formed at a proximal-end-side surface 511 of the shutter main body 51, as shown in FIG. 7.

As shown in FIGS. 8 and 9, the bottom-surface section 43 of the shutter housing 40 includes a plate-like shaped bottom-surface main body 43a brought into contact with the bottom wall S13a of the SC optical adapter S1 (hereinafter, simply referred to as optical adapter), a pair of support pieces 43b and 43c extending from the bottom-surface main body 43a to a first end side between the first bearing part 53 and the second bearing part 54 of the shutter member 50 and supporting the pivot shaft 44 in a state where the shutter member 50 is coupled with the shutter housing 40, a first stopper piece 43d extending from the bottom-surface main body 43a to the first end side at a position outward in an axial-line direction 44a of the pivot shaft 44 than the first bearing part 53 of the shutter member 50 in a state where the shutter member 50 is coupled with the shutter housing 40, the first stopper piece 43d facing to the proximal end of the pivot shaft 40, and a second stopper piece 43e extending from the bottom-surface main body 43a to the first end side at a position outward in the axial-line direction 44a of the pivot shaft 44 than the second bearing part 54 of the shutter member 50 in a state where the shutter member 50 is coupled with the shutter housing 40, the second stopper piece 43e facing to the distal end of the pivot shaft 40.

In the present embodiment, the pair of support pieces 43b and 43c includes a first support piece 43b provided adjacent to the first bearing part 53 of the shutter member 50, a second support piece 43c provided adjacent to the second bearing part 54 of the shutter member 50, and a space 43f which is defined between the first support piece 43b and the second support piece 43c and in which the coil spring 60 is positioned in a state of being externally mounted around the pivot shaft 44, with a state where the shutter member 50 is coupled with the shutter housing 40 as a reference.

The coil spring 60 is externally mounted on the pivot shaft 44 in the space 43f in a state where a first end thereof is engaged with inside of the shutter member 50 and a second end thereof is engaged with the outer surface of the bottom-surface section 43 so that the elasticity stored in the coil spring 60 is increased as the shutter member 50 moves from the closing position to the opening position.

An assembling process for coupling the shutter member 50 with the shutter housing 40 is now described.

First, a first deformation is made on the first stopper piece 43d of the shutter housing 40 so that a distal end of the first stopper piece 43d is positioned away from the bottom wall S13a of the optical adapter S1 (that is, the distal end of the first stopper piece 43d is positioned downward), and in this state, the distal end of the pivot shaft 44 is inserted through the first bearing part 53 of the shutter member 50. At the time, the distal end of the pivot shaft 44 is supported by the first support piece 43b of the bottom-surface section 43 in the shutter housing 40. After that, the distal end of the pivot shaft 44 is inserted through the coil spring 60 in the space 43f, and the distal end of the pivot shaft 44 is then supported by the second support piece 43e. Finally, the distal end of the pivot shaft 44 is inserted through the second bearing part 54.

In a state where the distal end of the pivot shaft 44 is inserted through the second bearing part 54, the second stopper piece 43e is positioned so as to face to the distal end of the pivot shaft 44, thereby effectively preventing the pivot shaft 44 from slipping out in the insertion direction. After the insertion of the distal end of the pivot shaft 44 through the second bearing part 54, a second deformation is made on the first stopper piece 43d so that the distal end of the first stopper piece 43d is close to the bottom wall S13a of the optical adapter S1 to be positioned at its initial position before the first deformation is made, which causes the first stopper piece 43d to face to the proximal end of the pivot shaft 44. Accordingly, the pivot shaft 44 can be prevented by the first stopper piece 43d from slipping out in a direction opposite to the insertion direction.

In the present embodiment, the second bearing part 54 is formed with a guide groove 55 that is opened at an opposing end surface facing to the first bearing part 53 and that is along a direction orthogonal to the axial-line direction 44a of the pivot shaft 44. Specifically, the guide groove 55 is configured so that its opening width is larger than a diameter of a bearing hole 56 of the second bearing part 54 at the opposing end surface 54a and becomes narrow as it being away from the opposing end surface 54a in a direction opposite to the first bearing part 53 (the opening width becomes substantially equal to the diameter of the bearing hole 56 at a bottom surface of the guide groove 55, which is positioned most outward in the axial-line direction).

The shutter member 50 including the second bearing part 54 formed with the guide groove 55 is formed by using a die that includes a first formation portion and a second formation portion, the first formation portion being used for forming the entire shutter member 50 including the bearing parts 53 and 54 other than the guide groove 55, and the second formation portion being used for forming the guide groove 55 at the second bearing part 54. The second formation portion is configured so that its end portion, which faces to the opposing end surface 54a of the second bearing part 54, has a pair of tapered surfaces in which a width between the pair of tapered surfaces becomes narrow as they advance in a direction toward the distal end of the axial-line direction 44a of the pivot shaft 44. The second formation portion is detachably mounted to the first formation portion so as to be slidable in a direction along the tapered surfaces of the second formation portion, in other words, in the direction orthogonal to the pivot shaft 44.

The shutter member 50 is formed from resin by using the thus configured die. Specifically, firstly, the second formation portion is set at a predetermined position relative to the first formation portion, and resin is poured thereinto. After the resin is solidified, the second formation portion is slid along the tapered surfaces (along the direction orthogonal to the axial-line direction 44a) so that the second formation portion is removed from a portion where the guide groove 55 has been formed. Then, the solidified resin is pulled out of the first formation portion, and the shutter member 50 is integrally formed. Accordingly, the guide groove 55 having such a pair of tapered surfaces that are most away from each other at the opposing end surface 54a and come close to each other as they advance in the direction opposite to the first bearing part 53 is easily formed in the second bearing part 54.

In the manufacturing method of the shutter member 50, when the shutter member 50 including the first and second bearing parts 53 and 54 is formed in the die by means of the resin molding, the second formation portion for forming the guide groove 55 can be slid relative to the first formation portion in the direction orthogonal to the axial-line direction 44a of the pivot shaft 44, as described above. Therefore, when the second formation portion is removed, the second formation portion can be easily removed without any intervention from the first bearing part 53 facing to the second bearing part 54. As a result, the guide groove 55 can be easily formed.

Further, since the opening width of the guide groove 55 is larger than the diameter of the bearing hole 56 of the second bearing part 54 at the opposing end surface 54a, and becomes narrow as advancing from the opposing end surface 54a in the direction opposite to the first bearing part 53, it is possible to guide the distal end of the pivot shaft 44 to the bearing hole 56 of the second bearing part 54 by the guide groove 55 of the second bearing part 54 when the distal end of the pivot shaft 44 which has been inserted through the first bearing part 53 is inserted from the opposing end surface 54a of the second bearing part 54 into the bearing hole 56, thereby enhancing workability in inserting the pivot shaft 44 into the second bearing part 54.

As a result, it is possible to enhance the assembly workability of the shutter assembly in which the shutter member 50 is coupled in a swingable manner with the shutter housing 40 via the pivot shaft 44 so as to selectively open or close the opening end S18a of the optical adapter 50.

In the present embodiment, the first bearing part 53 is formed with a guide hole 57 which is opened to an outer end surface 53a on a side opposite to the second bearing part 54 and which has a diameter becoming smaller as advancing toward a direction close to the second bearing part 54, as shown in FIG. 7.

That is, the guide hole 57 is formed at the outer end surface 53a of the first bearing part 53 from which the pivot shaft 44 is inserted into the bearing hole 56 of the first bearing part 53 so that the diameter of the guide hole 57 becomes smaller as advancing in the direction close to the second bearing part 54, which is the direction in which the pivot shaft 44 is inserted. Therefore, it is possible to effectively guide the distal end of the pivot shaft 44 into the bearing hole 56 of the first bearing part 53 by the guide hole 57, thereby enhancing workability in inserting the pivot shaft 44 into the first bearing part 53.

In the present embodiment, the proximal-end-side surface 511 of the shutter main body 51 is provided with an engagement hole 511a into which a first end of the coil spring 60 is engaged.

In the constitution, the coil spring 60 is externally mounted on the pivot shaft 44 in a state where the first end of the coil spring 60 is engaged into the shutter member 50 and the second end of the coil spring 60 is engaged with the outer surface of the bottom-surface section 43 in the shutter housing 40 (in the preferable configuration, the second end of the coil spring 60 is engaged into a guide groove formed at the outer surface of the bottom-surface section 43). According to the configuration, it is possible to easily cause the spiral of the coil spring 60 to be tightened as the shutter member 50 is moved from the closing position to the opening position, which increases the elasticity stored in the coil spring 60. Therefore, the shutter member 50 is reliably energized toward the closing position.

Furthermore, according to the configuration in which the first end of the coil spring 60 is engaged into engagement hole 511*a* formed in the proximal-end-side surface 511 of the shutter main body 51, it is possible to insert the pivot shaft 44 into the bearing parts 54 and 53 in a state where the first end of the coil spring 60 is hold by the engagement hole 511*a* of the shutter main body 51. As a result, it is possible to prevent the coil spring 60 from falling off in the insertion process while easily positioning the coil spring 60 in the space 43*f*, thereby facilitating the assembly workability.

In the present embodiment, the proximal-end-side surface 511 of the shutter main body 51 is formed so as to have a notch 511*b* in a at least region corresponding to the first stopper piece 43*d*, as shown in FIGS. 8 and 9.

Specifically, if the entire area of the proximal-end-side surface 511 of the shutter main body 51 has a linear shape, a gap between the first stopper piece 43*d* and the proximal-end-side surface 511 becomes small. Therefore, it becomes difficult to perform the second deformation on the first stopper piece 43*d* so that the first stopper piece 43*d* is deformed again in the direction close to the bottom wall S13*a* of the optical adapter S1 to be positioned at its initial position. That is, in a case where the gap between the first stopper piece 43*d* and the proximal-end-side surface 511 is small, the first stopper piece 43*d* may not return to its initial position before the first deformation is made due to its elasticity, which may cause a problem that the first stopper piece 43*d* could not reliably prevent the pivot shaft 44 from slipping out.

In order to avoid the problem, the region of the proximal-end-side surface 511 of the shutter main body 51, which corresponds to the first stopper piece 511, is cut out by the notch 511*b*. According to the configuration, a distance between the distal end of the first stopper piece 43*d* and the region of the proximal-end-side surface 511 which corresponds to the distal end of the first stopper piece 43*d* becomes larger than a distance between the distal end of the second stopper piece 43*e* and the region of the proximal-end-side surface 511 which corresponds to the distal end of the second stopper piece 43*e* (the gap between the first stopper piece 43*d* and the proximal-end-side surface 511 could be increased). Therefore, when performing the second deformation on the first stopper piece 43*d* so that the first stopper piece 43*d* is deformed in the direction close to the bottom wall S13*a* of the optical adapter S1 to its initial position, it is possible to easily increase a degree of the bending deformation, thereby reliably repositioning the first stopper piece 43*d* at its initial position before the first deformation is performed. As a result, the pivot shaft 44 can be more reliably prevented from slipping out by the first stopper piece 43*d*.

In the present embodiment, the first support piece 43*b* includes a first inner-side support piece 43*b*1 adjacent to the first bearing part 53 and a first outer-side support piece 43*b*2 adjacent to the space 43*f* (that is, adjacent to the coil spring 60), both of which supports the pivot shaft 44. The first inner-side support piece 43*b*1 restricts the movement of the pivot shaft 44 toward the bottom-surface main body 43*a* in a state where the shutter member 50 is coupled with the shutter housing 40. The first outer-side support piece 43*b*2 restricts the movement of the pivot shaft 44 in a direction perpendicular to the bottom-surface section 43 and also in the first end side of the bottom-surface section 43 in a state where the shutter member 50 is coupled with the shutter housing 40.

In a similar manner, the second support piece 43*c* includes a second inner-side support piece 43*c*1 adjacent to the second bearing part 54 and a second outer-side support piece 43*c*2 adjacent to the space 43*f* (that is, adjacent to the coil spring 60), both of which supports the pivot shaft 44. The second inner-side support piece 43*c*1 restricts the movement of the pivot shaft 44 toward the bottom-surface main body 44*a* in a state where the shutter member 50 is coupled with the shutter housing 40. The second outer-side support piece 43*c*2 restricts the movement of the pivot shaft 44 in the direction perpendicular to the bottom-surface section 43 and also in the first end side of the bottom-surface section 43 in a state where the shutter member 50 is coupled with the shutter housing 40.

More specifically, the first inner-side support piece 43*b*1 has a distal end portion extending in a direction substantially orthogonal to the bottom-surface main body 43*a*. In the present embodiment, the first inner-side support piece 43*b*1 has an arm portion extending from the bottom-surface main body 43*a* and the distal end portion bent from the arm portion at substantially the right angle so that a free end of the distal end portion is away from the first bottom wall S13*a* in the optical adapter S1. The distal end portion of the first inner-side support piece 43*b*1 is positioned close to the bottom-surface main body 43*a* than the pivot shaft 44. Further, the first outer-side support piece 43*b*2 has an arc potion so that its distal end portion is substantially in parallel with the main-body main body 43*a* at a position away from the first bottom wall S13*a*. In the present embodiment, the first outer-side support piece 43*b*2 includes an arm portion extending from the bottom-surface main body 43*a*, the arc portion extending from a free end of the arm portion, and the distal end portion connected to the arm portion through the arc portion. The arc portion is positioned away from the bottom-surface main body 43*a* than the pivot shaft 44. As described above, the second support piece 43*c* has the same configuration as the first support piece 43*b*. Accordingly, the pivot shaft is supported in a rotatable manner around its axis line by inner surfaces of the arc portions of the first and second outer-side support piece 43*b*2 and 43*c*2.

In the present embodiment, the first stopper piece 43*d* includes an arm portion 43*d*1 extending from the bottom-surface main body 43*a* to the first end side, and a stopping-surface portion 43*d*2 bent from the arm portion 43*d*1 so as to face to the proximal end of the pivot shaft 44.

In a similar manner, the second stopper piece 43*e* includes an arm portion 43*e*1 extending from the bottom-surface main body 43*a* to the first end side, and a stopping-surface portion 43*e*2 bent from the arm portion 43*e*1 so as to face to the distal end of the pivot shaft 44.

More specifically, the arm portion 43*d*1 of the first stopper piece 43*d* has a plate-like shape extending to the first end side from the bottom-surface main body 43*a*. The stopping-surface portion 43*d*2 of the first stopper piece 43*d* is formed by an end piece extending inward in the lateral direction of the bottom-surface main body 43*a* from a distal end of the arm portion 43*d*1. The end piece is bent at substantially the right angle relative to the bottom-surface main body 43*a* on a bending line along the direction orthogonal to the axial-line direction of the pivot shaft 44 in the mounted state (that is, the bending line is along a longitudinal direction of the arm portion) so that a distal end of the end piece is away from the first bottom wall S13*a* of the optical adapter S1, thereby forming the stopping-surface portion 43*d*2 that faces to the proximal end of the pivot shaft 44 in the mounted state.

In a similar manner, the arm portion 43*e*1 of the second stopper piece 43*e* has a plate-like shape extending to the first end side from the bottom-surface main body 43*a*. The stopping-surface portion 43*e*2 of the second stopper piece 43*e* is formed by an end piece extending inward in the lateral direction of the bottom-surface main body 43*a* from a distal end of the arm portion 43*e*1. The end piece is bent at substantially the right angle relative to the bottom-surface main body 43*a* on a bending line along the direction orthogonal to the axial-line direction of the pivot shaft 44 in the mounted state so that a distal end of the end piece is away from the first bottom wall S13a, thereby forming the stopping-surface portion 43e2 that faces to the distal end of the pivot shaft 44 in the mounted state.

As described, the stopping-surface portions 43d2 and 43e2 are formed by bending the respective end pieces on the respective bending lines substantially perpendicular to the axial-line direction 44a of the pivot shaft 44.

According to the configuration, the first stopper piece 43d and the second stopper piece 43e prevent the pivot shaft 44 from slipping out by contacting in a surface-to-surface manner with the proximal end and the distal end of the pivot shaft 44, respectively. Therefore, it is possible to reliably prevent the pivot shaft 44 from slipping out by the first stopper piece 43d and the second stopper piece 43e.

In particular, the above configuration in which the first stopper piece 43d and the second stopper piece 43e are brought into contact with the proximal end and the distal end of the pivot shaft 44 in a surface-to-surface manner is effective in a case where there are differences in the degree of the second deformation for deforming the first stopper piece 43d again in the direction adjacent to the first bottom wall S13a of the optical adapter S1 to its initial position before the first deformation is made. That is, even in the case, the above configuration makes it possible to reliably prevent the pivot shaft 44 from slipping out.

In the present embodiment, a proximal end of the arm portion 43d1 of the first stopper piece 43d is at a position more distant from the first-end-side edge 431 of the bottom-surface section 43 than a proximal end of the arm portion 43e1 of the second stopper piece 43e. In other words, an arm length of the arm portion 43d1 of the first stopper piece 43d is set to be larger than that of the arm portion 43e1 of the second stopper piece 43e.

According to the configuration, it is possible to more largely deform the first stopper piece 43d in the direction distant from the first bottom wall S13a of the optical adapter S1 (downward in the present embodiment) without difficulty, which allows the pivot shaft 44 to be more easily inserted.

In the present embodiment, corner portions of the respective pieces of the shutter housing 40 (for example, distal ends and proximal ends of the arm portions 43d1 and 43e1 of the first and second stopper pieces 43d and 43e, distal ends and proximal ends of the first and second support pieces 43b and 43c, and the like) are rounded. Accordingly, any scar or damage possibly generated by the contact of the corner portions can be prevented, and the occurrence of any possible injury when the optical connector S2 is connected can be prevented.

The preferred embodiment of the present invention was thus described. However, the present invention is not limited to the preferred embodiment, and can be variously improved, modified and corrected within the spirit and scope of the present invention.

For example, the above embodiment has been explained by taking, as an example, a case where the engagement hole 511a into which the first end of the coil spring 60 is engaged is formed in the proximal-end-side surface 511 of the shutter main body 51. However, the present invention is not limited thereto. An engagement groove may be formed on the outer surface of the shutter member 50, and the coil spring 60 may be externally mounted on the pivot shaft 44 in a state where the first end of the coil spring 60 is engaged with the engagement groove of the shutter member 50 and the second end of the coil spring 60 is engaged with the outer surface of the bottom-surface section 43.

Further, in the above embodiment, the stopping-surface portions 43d2 and 43e2 are formed by bending the respective the end pieces, which extend inward in the lateral direction of the bottom-surface main body 43a from the distal ends of the arm portions 43d1 and 43e1 of the first and second stopper pieces 43d and 43e, at substantially the right angle relative to the respective arm portions 43d1 and 43e1 on the bending line along the respective arm portions 43d1 and 43e1. However, the present invention is not limited thereto. For example, the distal end portions of the arm portions 43d1 and 43e1 of the first and second stopper pieces 43d and 43e may be bent on a bending line substantially in parallel with the axial-line direction 44a of the pivot shaft 44 at substantially the right angle so that free ends of the distal end portion are distant from the first bottom wall S13a or L13a and side surfaces of the distal end portions respectively face to the ends of the pivot shaft 44.

Furthermore, in the present embodiment as described above, when the shutter member 50 is positioned at the closing position, the ribs 52 are brought into contact with the first-end-side edges of the upper region 423 in a state where the inner peripheral surface of the shutter main body 51 is brought into contact with the first-end-side edges of the lower regions 424. However, the present invention is not limited thereto.

For example, the inner peripheral surface of the shutter main body 51 may be configured to be brought into contact with the first-end-side edge 411 of the upper-surface section 41 of the shutter housing 40 or the first upper wall S11a or L11a of the optical adapter S1 or L1 when the shutter member 50 is positioned at the closing position.

Alternatively, the pair of ribs 52 may configured so as to be positioned outward of the pair of side-surface sections 42 of the shutter housing 40 in the lateral direction of the shutter housing 40 in a state where the inner peripheral surface of the shutter main body 51 is brought into contact with the first-end-side edge of the lower region 424 when the shutter member 50 is positioned at the closing position. In other words, the pair of ribs 52 may be configured so that a width between inner surfaces thereof is larger than a width between the outer surfaces of the pair of side-surface sections 42 of the shutter housing 40. Further, in the alternative configuration, the ribs 52 may be configured so as to overlap the upper region 423 of the housing 40 as viewed from the lateral side.

What is claimed is:

1. A shutter assembly mounted on a first end side of an optical adapter to which a first optical cable with an optical connector is detachably coupled from the first end side and a second optical cable is coupled from a second end side, the optical adapter being configured so that first and second end sides of an inner space defined by a bottom wall, a pair of side wall and an upper wall respectively form first and second accommodating sections that respectively accept the first and second optical cables, and a hollow sleeve into which ferrules of the first and second optical cables are inserted is arranged on an intermediate portion of the inner space, the shutter assembly comprising:

a shutter housing which is mounted on the first end side of the optical adapter so as to surround the optical adapter, the shutter housing including a bottom-surface section, a pair of side-surface sections and an upper-surface section respectively brought into contact with the outer peripheral surfaces of the bottom wall, the pair of side walls and the upper wall of the optical adapter in a state of being mounted on the optical adapter;

a shutter member coupled in a swingable manner with a first-end-side edge of the bottom-surface section through a pivot shaft so as to open or close a first-endside opening of the shutter housing defined by first-end-side edges of the upper-surface section, the pair of side-surface sections and the bottom-surface section; and a coil spring which energizes the shutter member in such a direction that the shutter member closes the first-end-side opening of the shutter housing, wherein the shutter member includes a shutter main body that closes the first-end-side opening of the shutter housing, and a pair of first and second bearing parts which are integrally formed on a proximal-end-side surface of the shutter main body and through which the pivot shaft is inserted, the second bearing part is formed with a guide groove that is opened at an opposing end surface facing to the first bearing part and that is along a direction orthogonal to an axial-line direction of the pivot shaft, and the guide groove has an opening width that is larger than a diameter of a bearing hole of the second bearing part at the opposing end surface and that becomes narrow as it moves away from the opposing end surface in a direction opposite to the first bearing part.

2. A shutter assembly mounted on a first end side of an optical adapter to which a first optical cable with an optical connector is detachably coupled from the first end side and a second optical cable is coupled from a second end side, the optical adapter being configured so that first and second end sides of an inner space defined by a bottom wall, a pair of side wall and an upper wall respectively form first and second accommodating sections that respectively accept the first and second optical cables, and a hollow sleeve into which ferrules of the first and second optical cables are inserted is arranged on an intermediate portion of the inner space, the shutter assembly comprising:

a shutter housing which is mounted on the first end side of the optical adapter so as to surround the optical adapter, the shutter housing including a bottom-surface section, a pair of side-surface sections and an upper-surface section respectively brought into contact with the outer peripheral surfaces of the bottom wall, the pair of side walls and the upper wall of the optical adapter in a state of being mounted on the optical adapter;

a shutter member coupled in a swingable manner with a first-end-side edge of the bottom-surface section through a pivot shaft so as to open or close a first-end-side opening of the shutter housing defined by first-end-side edges of the upper-surface section, the pair of side-surface sections and the bottom-surface section; and a coil spring which energizes the shutter member in such a direction that the shutter member closes the first-end-side opening of the shutter housing, wherein the shutter member includes a shutter main body that closes the first-end-side opening of the shutter housing, and a pair of first and second bearing parts which are integrally formed on a proximal-end-side surface of the shutter main body and through which the pivot shaft is inserted, the second bearing part is formed with a guide groove that is opened at an opposing end surface facing to the first bearing part and that is along a direction orthogonal to an axial-line direction of the pivot shaft, the guide groove has an opening width that is larger than a diameter of a bearing hole of the second bearing part at the opposing end surface and that becomes narrow as it moves away from the opposing end surface in a direction opposite to the first bearing part, and wherein the first bearing part is formed with a guide hole that is opened at an outer end surface on a side opposite to the second bearing part and that has a diameter becoming smaller as it advances in a direction close to the second bearing part.

3. A shutter assembly mounted on a first end side of an optical adapter to which a first optical cable with an optical connector is detachably coupled from the first end side and a second optical cable is coupled from a second end side, the optical adapter being configured so that first and second end sides of an inner space defined by a bottom wall, a pair of side wall and an upper wall respectively form first and second accommodating sections that respectively accept the first and second optical cables, and a hollow sleeve into which ferrules of the first and second optical cables are inserted is arranged on an intermediate portion of the inner space, the shutter assembly comprising:

a shutter housing which is mounted on the first end side of the optical adapter so as to surround the optical adapter, the shutter housing including a bottom-surface section, a pair of side-surface sections and an upper-surface section respectively brought into contact with the outer peripheral surfaces of the bottom wall, the pair of side walls and the upper wall of the optical adapter in a state of being mounted on the optical adapter;

a shutter member coupled in a swingable manner with a first-end-side edge of the bottom-surface section through a pivot shaft so as to open or close a first-end-side opening of the shutter housing defined by first-end-side edges of the upper-surface section, the pair of side-surface sections and the bottom-surface section; and a coil spring which energizes the shutter member in such a direction that the shutter member closes the first-end-side opening of the shutter housing, wherein the shutter member includes a shutter main body that closes the first-end-side opening of the shutter housing, and a pair of first and second bearing parts which are integrally formed on a proximal-end-side surface of the shutter main body and through which the pivot shaft is inserted, the second bearing part is formed with a guide groove that is opened at an opposing end surface facing to the first bearing part and that is along a direction orthogonal to an axial-line direction of the pivot shaft, the guide groove has an opening width that is larger than a diameter of a bearing hole of the second bearing part at the opposing end surface and that becomes narrow as it moves away from the opposing end surface in a direction opposite to the first bearing part, wherein the bottom-surface section includes a plate-like shaped bottom-surface main body brought into contact with the bottom wall;

a support piece extending from the bottom-surface main body to a first end side between the first and second bearing parts and supporting the pivot shaft in a state where the shutter member is coupled with the shutter housing;

a first stopper piece extending from the bottom-surface main body to the first end side at a position outward in an axial-line direction of the pivot shaft than the first bearing part in a state where the shutter member is coupled with the shutter housing, the first stopper piece facing to a proximal end of the pivot shaft; and a second stopper piece extending from the bottom-surface main body to the first end side at a position outward in the axial-line direction of the pivot shaft than the second bearing part in a state where the shutter member is coupled with the shutter housing, the second stopper piece facing to a distal end of the pivot shaft, and the proximal-end-side surface of the shutter main body is configured so that at least a region corresponding to the first stopper piece is cut out.

4. A shutter assembly according to claim 3, wherein the first stopper piece includes an arm portion extending from the bottom-surface main body to the first end side, and a stopping-surface portion bent from the arm portion so as to face to the proximal end of the pivot shaft.

5. A shutter mounted on a first end side of an optical adapter to which a first optical cable with an optical connector is detachably coupled from the first end side and a second optical cable is coupled from a second end side, the optical adapter being configured so that first and second end sides of an inner space defined by a bottom wall, a pair of side wall and an upper wall respectively form first and second accommodating sections that respectively accept the first and second optical cables, and a hollow sleeve into which ferrules of the first and second optical cables are inserted is arranged on an intermediate portion of the inner space, the shutter assembly comprising:

a shutter housing which is mounted on the first end side of the optical adapter so as to surround the optical adapter, the shutter housing including a bottom-surface section, a pair of side-surface sections and an upper-surface section respectively brought into contact with the outer peripheral surfaces of the bottom wall, the pair of side walls and the upper wall of the optical adapter in a state of being mounted on the optical adapter;

a shutter member coupled in a swingable manner with a first-end-side edge of the bottom-surface section through a pivot shaft so as to open or close a first-end-side opening of the shutter housing defined by first-end-side edges of the upper-surface section, the pair of side-surface sections and the bottom-surface section; and a coil spring which energizes the shutter member in such a direction that the shutter member closes the first-end-side opening of the shutter housing, wherein the shutter member includes a shutter main body that closes the first-end-side opening of the shutter housing, and a pair of first and second bearing parts which are integrally formed on a proximal-end-side surface of the shutter main body and through which the pivot shaft is inserted, the second bearing part is formed with a guide groove that is opened at an opposing end surface facing to the first bearing part and that is along a direction orthogonal to an axial-line direction of the pivot shaft, the guide groove has an opening width that is larger than a diameter of a bearing hole of the second bearing part at the opposing end surface and that becomes narrow as it moves away from the opposing end surface in a direction opposite to the first bearing part, wherein the coil spring has a first end engaged into inside portion or with an outer surface of the shutter member and a second end engaged with an outer surface of the bottom-surface section so that its stored elasticity becomes large as the shutter member moves from the closing position to the opening position, and the shutter main body includes an engagement hole which is formed at the proximal-end-side surface of the shutter main body and into which a first end of the coil spring is engaged, or an engagement groove which is formed at an outer surface of the shutter main body and into which the first end of the coil spring is engaged.

* * * * *